(12) United States Patent
Maruyama et al.

(10) Patent No.: US 6,924,823 B2
(45) Date of Patent: Aug. 2, 2005

(54) RECORDING MEDIUM, PROGRAM, IMAGE PROCESSING METHOD, AND IMAGE PROCESSING DEVICE

(75) Inventors: Yukitada Maruyama, Saitama (JP); Takafumi Fujisawa, Tokyo (JP); Tomohiro Hasekura, Tokyo (JP)

(73) Assignee: Sony Computer Entertainment, Inc. (JP)

( * ) Notice: Subject to any disclaimer, the term of this patent is extended or adjusted under 35 U.S.C. 154(b) by 241 days.

(21) Appl. No.: 09/945,780

(22) Filed: Sep. 4, 2001

(65) Prior Publication Data

US 2002/0089521 A1 Jul. 11, 2002

(30) Foreign Application Priority Data

Sep. 1, 2000 (JP) .................................. P2000-266321

(51) Int. Cl.$^7$ .......................... G09G 5/00; G06T 15/00; G06T 11/20
(52) U.S. Cl. ...................................... 345/660; 345/442
(58) Field of Search ................................ 345/660, 649, 345/648, 639, 419, 442; 355/47, 97

(56) References Cited

U.S. PATENT DOCUMENTS

| | | | |
|---|---|---|---|
| 4,620,287 A | | 10/1986 | Yam |
| 5,608,856 A | * | 3/1997 | McInally .................... 345/442 |
| 5,692,117 A | * | 11/1997 | Berend et al. .............. 345/475 |
| 5,748,192 A | * | 5/1998 | Lindholm ................... 345/649 |
| 6,188,432 B1 | * | 2/2001 | Ejima ..................... 348/240.99 |
| 6,208,360 B1 | * | 3/2001 | Doi et al. ................... 345/474 |
| 6,300,955 B1 | * | 10/2001 | Zamir ........................ 382/283 |
| 6,323,863 B1 | * | 11/2001 | Shinagawa et al. ......... 345/441 |
| 6,342,886 B1 | * | 1/2002 | Pfister et al. ............... 345/424 |
| 6,389,180 B1 | * | 5/2002 | Wakisawa et al. .......... 382/298 |
| 6,483,519 B1 | * | 11/2002 | Long et al. ................. 345/649 |
| 6,535,213 B1 | * | 3/2003 | Ogino et al. ................ 345/442 |
| 6,675,061 B2 | * | 1/2004 | Hirai et al. ................. 700/189 |
| 2002/0080151 A1 | * | 6/2002 | Venolia ...................... 345/660 |
| 2002/0135601 A1 | * | 9/2002 | Watanabe et al. ........... 345/660 |

FOREIGN PATENT DOCUMENTS

| FR | 2 646 257 A1 | 10/1990 |
|---|---|---|
| JP | 09-185722 A1 | 7/1997 |

OTHER PUBLICATIONS

"Bezier Curve", Online Computing Dictionary, Jun. 12, 1996, http://www.instantweb.com/foldoc/foldoc.cgi?Bezier+curve.

"Bezier Curve Ahead", Mac Tech, vol. 5, 1989, http://www.mactech.com/articles/mactech/Vol.05/05.01/Bezier Curve.

Foley, J.D. et al., "Computer Graphics—Principles and Practice", Jul. 1997, p. 194.

* cited by examiner

Primary Examiner—Jeffery Brier
Assistant Examiner—Javid Amini
(74) Attorney, Agent, or Firm—Lerner, David, Littenberg, Krumholz & Mentlik, LLP

(57) ABSTRACT

An image is freely enlarged/reduced in accordance with a user's control instruction to be displayed by reducing noises such as jaggy. An image processing device includes an affine transforming unit for affine transforming coordinates of a control point based on at least an enlarging ratio or a reducing ratio, a number of divisions setting unit for obtaining a ratio of a drawing range of a B'ezier curve after the affine transformation to an actual drawing range and setting the number of divisions of the parameter of the B'ezier curve in accordance with the obtained ratio, a B'ezier curve calculating unit for obtaining the number of curve defining points corresponding to the number of divisions on the basis of the set number of divisions and a coefficient based on a degree and the Bernstein base function, and a B'ezier curve drawing unit for drawing the B'ezier curve to an image memory based on the obtained curve defining point. Particularly, subsequent calculation of the B'ezier curve is canceled, when the actual drawing range does not include the B'ezier curve.

21 Claims, 24 Drawing Sheets

OBJECT DATA(230)　　　B'EZIER CURVE DATA (BCD)

| COMPONENT 1 | COLARATION INFORMATION | DEGREE | COORDINATAES OF CONTROL POINT |
|---|---|---|---|
| | | | |
| | | | |
| COMPONENT 2 | | | |
| | | | |
| ⋮ | | | |
| COMPONENT n | | | |
| | | | |

FIG.9

NORMAL COEFFICIENT TABLE (232)

| | |
|---|---|
| RECORD 0 | COEFFICIENT |
| RECORD 1 | COEFFICIENT |
| RECORD 2 | COEFFICIENT |
| RECORD 3 | COEFFICIENT |
| | ⋮ |

FIG.10

COEFFICIENT TABLE (234)

| | | | | |
|---|---|---|---|---|
| RECORD 0 | COEFFICIENT | COEFFICIENT | COEFFICIENT | COEFFICIENT |
| RECORD 1 | COEFFICIENT | COEFFICIENT | COEFFICIENT | COEFFICIENT |
| RECORD 2 | COEFFICIENT | COEFFICIENT | COEFFICIENT | COEFFICIENT |
| RECORD 3 | COEFFICIENT | COEFFICIENT | COEFFICIENT | COEFFICIENT |

OBJECT INFORMATION TABLE (242)

0/1: SOLUTION OF DIFFICULTY IS UNNECESSARY / NECESSARY
0/1: BEFORE/AFTER SOLUTION OF DIFFICULTY
0/1: INSPIRATION IS GOTTEN/ISN'T

| | ADDRESS OF OBJECT DATA | ITEM NO. | DISPLAY RANGE | ADDRESS(1) OF OPERATING DATA FILE | ADDRESS(2) OF OPERATING DATA FILE | ADDRESS(3) OF OPERATING DATA FILE | INDEX INFORMATION |
|---|---|---|---|---|---|---|---|
| RECORD 0 | ADDRESS OF OBJECT DATA | ITEM NO. | DISPLAY RANGE | ADDRESS(1) OF OPERATING DATA FILE | ADDRESS(2) OF OPERATING DATA FILE | ADDRESS(3) OF OPERATING DATA FILE | INDEX INFORMATION |
| RECORD 1 | ADDRESS OF OBJECT DATA | ITEM NO. | DISPLAY RANGE | ADDRESS(1) OF OPERATING DATA FILE | ADDRESS(2) OF OPERATING DATA FILE | ADDRESS(3) OF OPERATING DATA FILE | INDEX INFORMATION |
| RECORD 2 | ADDRESS OF OBJECT DATA | ITEM NO. | DISPLAY RANGE | ADDRESS(1) OF OPERATING DATA FILE | ADDRESS(2) OF OPERATING DATA FILE | ADDRESS(3) OF OPERATING DATA FILE | INDEX INFORMATION |
| RECORD 3 | ADDRESS OF OBJECT DATA | ITEM NO. | DISPLAY RANGE | | | | |

ITEM INFORMATION TABLE (246)

| | ITEM NO. | DISPLAY RANGE |
|---|---|---|
| RECORD 0 | | |
| RECORD 1 | | |
| RECORD 2 | | |
| RECORD 3 | | |
| ⋮ | ⋮ | ⋮ |

ITEM INFORMATION FLAG (248)

0/1: ITEM IS ASSURED/NOT ASSURED

| | (16+1) DIVISIONS | (8+1) DIVISIONS | (4+1) DIVISIONS | (2+1) DIVISIONS | (1-t)*(1-t)*(1-t) | 3*t*(1-t)*(1-t) | 3*t*t*(1-t) | t*t*t |
|---|---|---|---|---|---|---|---|---|
| 0/16 | 0.00000000 | 0.00000000 | 0.00000000 | 0.00000000 | 1.00000000 | 0.00000000 | 0.00000000 | 0.00000000 |
| 1/16 | 0.06250000 | | | | 0.82397461 | 0.16479492 | 0.01098633 | 0.00024414 |
| 2/16 | 0.12500000 | 0.12500000 | | | 0.66992188 | 0.28710938 | 0.04101583 | 0.00195313 |
| 3/16 | 0.18750000 | | | | 0.53637695 | 0.37133789 | 0.08569336 | 0.00659180 |
| 4/16 | 0.25000000 | 0.25000000 | 0.25000000 | | 0.42187500 | 0.42187500 | 0.14062500 | 0.01536250 |
| 5/16 | 0.31250000 | | | | 0.32495117 | 0.44311523 | 0.20141602 | 0.03051758 |
| 6/16 | 0.37500000 | 0.37500000 | | | 0.24414063 | 0.43945313 | 0.26367188 | 0.05273438 |
| 7/16 | 0.43750000 | | | | 0.17797852 | 0.41528320 | 0.32299805 | 0.08374023 |
| 8/16 | 0.50000000 | 0.50000000 | 0.50000000 | 0.50000000 | 0.12500000 | 0.37500000 | 0.37500000 | 0.12500000 |
| 9/16 | 0.56250000 | | | | 0.08374023 | 0.32299805 | 0.41528320 | 0.17797852 |
| 10/16 | 0.62500000 | 0.62500000 | | | 0.05273438 | 0.26367188 | 0.43945313 | 0.24414063 |
| 11/16 | 0.68750000 | | | | 0.03051758 | 0.20141602 | 0.44311523 | 0.32495117 |
| 12/16 | 0.75000000 | 0.75000000 | 0.75000000 | | 0.01562500 | 0.14062500 | 0.42187500 | 0.42187500 |
| 13/16 | 0.81250000 | | | | 0.00659180 | 0.08569336 | 0.37133789 | 0.53637695 |
| 14/16 | 0.87500000 | 0.87500000 | | | 0.00195313 | 0.04101563 | 0.28710938 | 0.66992188 |
| 15/16 | 0.93750000 | | | | 0.00024414 | 0.01098633 | 0.16479492 | 0.82397461 |
| 16/16 | 1.00000000 | 1.00000000 | 1.00000000 | 1.00000000 | 0.00000000 | 0.00000000 | 0.00000000 | 1.00000000 |

FIG.27

RECORDING MEDIUM, PROGRAM, IMAGE PROCESSING METHOD, AND IMAGE PROCESSING DEVICE

CROSS-REFERENCE TO RELATED APPLICATIONS

The present application claims priority from Japanese Application No. P2000-266321 filed Sep. 1, 2000, the disclosure of which is hereby incorporated by reference herein.

FIELD OF THE INVENTION

The present invention relates to a recording medium for recording therein a program and data used in an image processing device capable of being connected to a controller and to a display device, the program itself, an image processing method for displaying an image on the display device, and the image processing device.

BACKGROUND OF THE INVENTION

Information equipment (entertainment system), such as entertainment devices, including a video game machine, is controlled by a controller while displaying a content of a game which is stored in a recording medium such as a CD-ROM on a screen of a television receiver so as to play a game.

In general, in the entertainment system, the entertainment device is connected to the controller via a serial interface. The entertainment device transmits a clock signal and, then, synchronously with the clock signal, the controller transmits key switch information and the like corresponding to a user's control operation.

Recently, in the entertainment system, a controller comprises vibration generating means for applying vibration to a user in response to external equipment, e.g., an entertainment device and, thereby, various vibrations are applied to a user in response to an user's control during a game play. This entertainment system is developed and is put into practical use.

Since a resolution of interpolation is preset in normal display processing of animation, there is a problem in that a contour of an image necessarily becomes blur and a jagged portion is caused, when the image is enlarged and displayed.

Conventionally, a screen for enlargement/reduction of an image is preset, and only on the preset screen, an input operation for the enlargement/reduction is allowed for the user.

However, depending on the kind of video games and the status of advancing scenario, the user has a request that he wants to enjoy various scenes while checking them by enlarging/reducing the images in realtime.

SUMMARY OF THE INVENTION

According to the present invention, to solve the problems, it is one object of the present invention to provide a recording medium, a program, an image processing method, and an image processing device in which noises such as jaggy are reduced and an image is enlarged and displayed.

Further, it is another object of the present invention to provide a recording medium, a program, an image processing method, and an image processing device in which an image can be freely enlarged and displayed in realtime in accordance with a user's control instruction and the making of a scenario of a video game is further improved.

According to the present invention, there is provided a recording medium for recording therein a program and data used in an image processing device which is capable of being connected to a controller for outputting at least a user's control request, as a control instruction and to a display device for displaying an image, wherein the program comprises: an image processing step of displaying an image displayed on a screen of the display device at least by reducing jaggy, when the image is displayed to be enlarged/reduced in accordance with the control instruction from the controller.

According to the present invention, there is provided an computer-readable executable program used for an image processing device which is capable of being connected to a controller for outputting at least a user's control request, as a control instruction and to a display device for displaying an image, wherein the program comprises an image processing step of displaying an image displayed on a screen of the display device at least by reducing jaggy when the image is displayed to be enlarged/reduced, in accordance with the control instruction from the controller.

According to the present invention, there is provided an image processing method for displaying an image on a display device, comprising the step of: displaying an image displayed on a screen of the display device at least by reducing jaggy when the image is displayed to be enlarged/reduced in accordance with a user's control instruction.

Accordingly, the image is enlarged and displayed by reducing noises such as jaggy. Therefore, the image can be freely enlarged/reduced in realtime in accordance with a user's control instruction. For example, the making of scenario in a video game can further be improved.

Preferably, the image processing step (means) may comprise a step (means) of drawing the image displayed on the screen of the display device by using a B'ezier curve and setting the number of divisions of a parameter in a Bernstein base function in accordance with at least an enlarging ratio or a reducing ratio.

Preferably, the program may further comprise: a step (means) of affine transforming coordinates of a control point while taking account of at least the enlarging ratio or the reducing ratio, obtaining a ratio of a drawing range of the B'ezier curve after the affine transformation to an actual drawing area, and determining the number of divisions of the parameter in accordance with the obtained ratio.

Preferably, the image processing step (means) may further comprise: an affine converting step of affine converting the coordinates of the control point based on at least the enlarging ratio or the reducing ratio; a number of divisions setting step of obtaining a ratio of a drawing range of the B'ezier curve after the affine transformation to an actual drawing range and setting the number of divisions of a parameter of the B'ezier curve in accordance with the obtained ratio; a B'ezier curve calculating step of obtaining the number of curve defining points corresponding to the number of divisions, on the basis of the set number of divisions and a coefficient based on a degree and the Bernstein base function; and a B'ezier curve drawing step of drawing the B'ezier curve to an image memory based on the obtained curve defining point.

Accordingly, if the enlarging ratio can be increased, the image is drawn by increasing the number of divisions of the parameter. If the reducing ratio is increased, the image can be displayed by decreasing the number of divisions of the parameter. The unnecessary calculation is omitted and the calculation time for drawing can be reduced.

Preferably, when the B'ezier curve is not included in the actual drawing area or when the display object is substantially small (e.g., the reducing ratio is large and the drawing of the B'ezier curve is unnecessary), subsequent calculation of the B'ezier curve is canceled.

Accordingly, the calculation time for drawing can be greatly reduced, and the image can be enlarged or reduced in realtime in accordance with the user's control instruction.

Preferably, a coordinate setting step (means) of obtaining new coordinates of the control point based on operation information for animation, prior to the affine transformation may be provided, when the image of the animation is displayed.

Accordingly, a moving image can be fast enlarged or reduced. For example, an image of a video game can be enlarged or reduced in realtime in accordance with a user's control instruction.

Preferably, a coefficient table may be used when obtaining the curve defining point of the B'ezier curve. The coefficient table registers, in an arrayed variable area referred to by one-time access, a plurality of coefficients determined based on a degree and the Bernstein base function, for determining one curve defining point.

Generally, when one curve defining point is obtained by using the coefficient table, the coefficient table must be referred to at the number of times corresponding to the number of coefficients determined by the degree and the Bernstein base function, thus causing a problem to prolong the processing time. However, according to the present invention, the number of coefficients necessary for obtaining one curve defining point referred to through one-time access is registered and, therefore, the coefficient table is referred to only once to obtain one curve defining point. The processing time can be greatly reduced.

Preferably, an enlargement/reduction setting step (means) of setting the enlarging ratio of the image based on the amount of rotation, in one direction, of a rotational control element provided for the controller and of setting the reducing ratio of the image based on the amount of rotation, in another direction, of the rotational control element may be provided.

Since the user can easily enlarge or reduce the image only by controlling the rotational control element. The enlargement/reduction of the image can be determined depending on the rotational direction of the rotational control element, and the enlarging ratio or the reducing ratio can be determined depending on the amount of rotation. Accordingly, the user can apparently and easily recognize the enlargement/reduction of the image and, then, he can easily issue an instruction for enlarging or reducing the image.

BRIEF DESCRIPTION OF THE DRAWINGS

FIG. 9 is an explanatory diagram showing the content of object data;

FIG. 10 is an explanatory diagram showing the content of a normal coefficient table;

FIG. 11 is an explanatory diagram showing the content of a coefficient table according to the embodiment;

FIG. 14 is an explanatory diagram showing the content of an object information table;

FIG. 27 is a table showing a specific example of a coefficient table.

DETAILED DESCRIPTION

Hereinbelow, a description is given of a case in which an image processing method and an image processing device according to the present invention are applied to an entertainment system, and of a case in which a recording medium and a program according to the present invention are applied to a recording medium and a program which record therein a program and data executed on the entertainment system, with reference to FIGS. 1 to 27.

Figure 1:
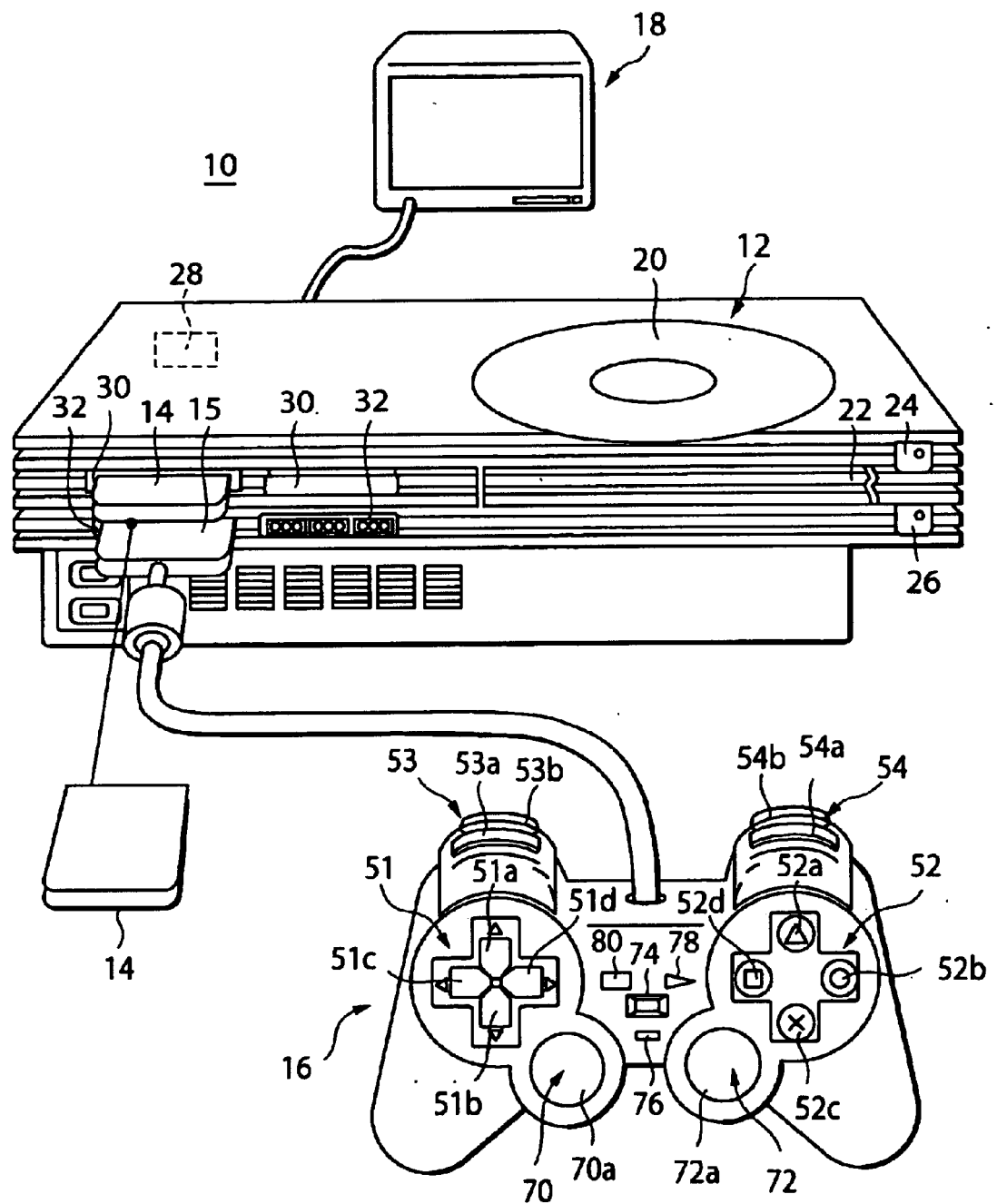
FIG. 1 is a diagram showing the structure of an entertainment system according to an embodiment of the present invention.

First, according to the embodiment, as shown in FIG. 1, an entertainment system 10 fundamentally comprises an entertainment device 12 for executing various programs, a memory card 14 which is detachable to the entertainment device 12, a controller 16 which is detachable to the entertainment device 12, and a monitor (display) 18 as a display device, such as a television receiver, to which video and audio signals from the entertainment device 12 are supplied.

The entertainment device 12 reads the program which are recorded to an optical disk 20, etc. such as a CD-ROM or a DVD-ROM, serving as a recording medium having a large capacity, and executes a game, etc. in response to an instruction from a user (e.g., a game player). The execution of the game mainly means that an input from a controller 16 is received via a connector 15 and an advance status of the game is controlled by controlling the display on the monitor 18 and sound.

As shown in FIG. 1, the entertainment device 12 has a shape obtained by piling up compressed cuboids. To a front panel, a disk tray 22 moving forward and backward, as a disk loading unit, to which the optical disk 20 as the recording medium for the program and the data is loaded, a reset switch 24 for arbitrarily resetting the programs and the like which are being executed at present, an open button 26 for drawing out the disk tray 22, two inlets 30 for a memory card 14, two controller terminals 32 to which the connector 15 of the controller 16 is plugged, and the like are arranged. To the rear side of the entertainment device 12, a power switch 28, an AV (audio visual) multi output terminal (not shown), as an output terminal of video data and audio data, which is connected to the monitor 18 via an AV cable, and the like are arranged.

The entertainment device 12 has therein a control function for reading the program from the optical disk 20 as the recording medium, such as the CD-ROM or the DVD-ROM, in which a program of a computer game (video game) and data are recorded, for executing the read program, and for displaying a character or a scene on the monitor 18. Further, the entertainment device 12 has therein a control function for replaying a movie of a DVD (digital versatile disk) as another optical disk 20 and for replaying music of a CDDA (compact disk digital audio) and the like.

Furthermore, the entertainment device 12 has therein a function for executing a program which is provided by communication via a communication network, etc. During the play of a game program, a three-dimensional computer graphic video data which is formed by the entertainment device 12, is displayed on the monitor 18 as the display device.

In this case, a signal from the controller 16 is also processed by one of the control functions of the entertainment device 12, and the content of the processed signal is used for, e.g., the motion of a character and a switching operation of a scene on the screen of the monitor 18.

In the controller 16, first and second control units 51 and 52 are provided at the right and left in the center of the top thereof, and third and fourth control units 53 and 54 are provided on the side thereof. At the right and left on the front side of the top thereof, are provided a left rotational control element 70 and a right rotational control element 72 serving as joy sticks for analog control operation.

The first control unit 51 is a pressing control unit for moving the character, etc. displayed on the screen of the monitor 18, has a function which is set by the program and the like which are recorded to the optical disk 20, and comprises four control keys (referred to as shift keys) 51a, 51b, 51c, and 51d having functions for moving the character, etc. in up and down directions and right and left directions. The shift keys 51a, 51b, 51c, and 51d are called an up shift key 51a, a down shift key 51b, a left shift key 51c, and a right shift key 51d, respectively.

The second control unit 52 comprises four control buttons 52a, 52b, 52c, and 52d which are cylindrical-shaped, for pressing control operation. Identification marks of "Δ" (triangle), "○" (circle), "x" (cross), "□" (square) are marked to the heads of the control buttons 52a to 52d, respectively. The control buttons 52a to 52d are called the "Δ" button 52a, the "○" button 52b, the "x" button 52c, and the "□" button 52d.

The control buttons 52a to 52d of the second control unit 52 has a function which is set by the program, etc. which are recorded to the optical disk 20, for moving the left and right arms and the left and right legs of the character, etc.

The third and fourth control units 53 and 54 have substantially the same structure, and two control buttons 53a for pressing control (referred to as L1 buttons), two control buttons 53b for pressing control (referred to as L2 buttons), two control buttons 54a for pressing control (referred to as R1 buttons), and two control buttons 54b for pressing (referred to as R2 buttons), all of which are arranged in the up and down directions, respectively. The third and fourth control units 53 and 54 have a function which is set by the program, etc. which are recorded to the optical disk 20, for allowing the character, etc. to perform a specific operation.

The left and right rotational control elements 70 and 72 comprises signal input elements, such as variable resistors, which can be inclined, and rotated in all directions around the control axes as center and output a value of one analog signal in accordance with the inclination and the rotation. The left and right rotational control elements 70 and 72 are returned to the center portion by an elastic material (not shown). The left and right rotational control elements 70 and 72 are pressed down, thereby outputting other analog signals different from the analog signal of the inclination and rotation thereof. That is, The left and right rotational control elements 70 and 72 have the function of the control button 70a (L3 button) and the control button 72a (R3 button) as fifth and sixth control units for pressing control.

By rotating and inclining the left and right rotational control elements 70 and 72, it is possible to input an instruction signal for analog motions such as an operation for rotating and moving the character, etc., an operation for moving the character, etc. while varying a speed, and an operation for changing the status of the character, etc.

Referring to FIG. 1, the left and right rotational control elements 70 and 72 can be switched to the first and second control units 51 and 52. The switching operation is performed by an analog mode switch 74. When the analog mode switch 74 selects the left and right rotational control elements 70 and 72, a display unit 76 is lit on, thereby displaying the selecting status of the left and right rotational control elements 70 and 72.

Figure 3:
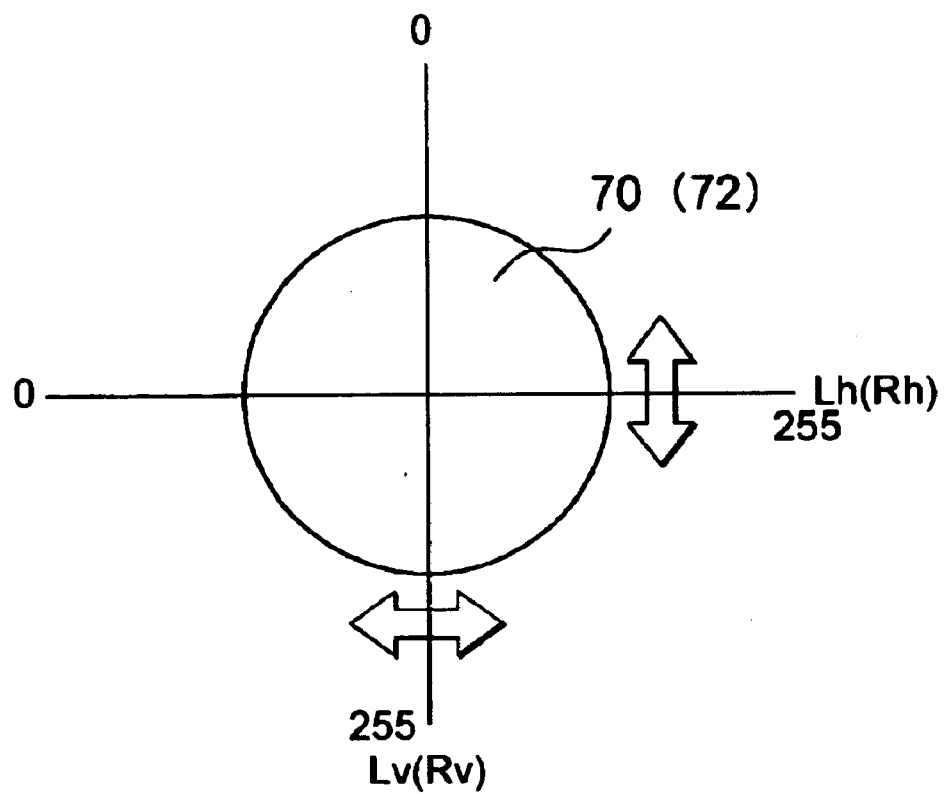
FIG. 3 is an explanatory diagram showing a relationship between a horizontal value and a vertical value which are determined by right and left rotational control elements.

As shown in FIG. 3, analog input values in the vertical direction, obtained by controlling the left and right rotational control elements 70 and 72 are "0" to "255" in descending order. Analog input values in the horizontal direction, obtained by controlling the left and right rotational control elements 70 and 72 are "0" to "255" from the left to the right.

In addition, the controller 16 comprises a start button (start switch) 78 for instructing the start of the game, etc., a selecting button (selecting switch) 80 for selecting the degree of difficulty of the game when the game starts, and the like.

Hereinbelow, a description is given of the internal structure and general operations of the entertainment device 12 shown in FIG. 1 with reference to FIG. 2.

In the entertainment device 12, a RAM 402 as a semiconductor memory and a bus 403 are connected to a CPU 401 for controlling the entertainment device 12.

A graphic synthesizer (GS) 404 and an input/output processor (IOP) 409 are connected to the bus 403. The GS 404 comprises a RAM (image memory) 405 including a frame buffer, a Z-buffer, a texture memory, and the like, and a rendering engine 406 having a rendering function including a function for drawing data to the frame buffer in the RAM 405.

The monitor 18 as external equipment is connected to the GS 404 via an encoder 407 for converting a digital RGB signal into a signal in an NTSC standard television format.

To the IOP 409, a driver (DRV) 410 for reading the data recorded to the optical disk 20 and decoding the read data, a sound generating system 412, the memory card 410, as an external memory, comprising a flash memory, the controller 16, and a ROM 416 for recording therein an OS (operating System), etc. are connected.

The sound generating system 412 is connected to a speaker 414, as external equipment, and to the monitor 18 via an amplifier 413, and supplies a audio signal. The sound generating system 412 comprises a sound processing unit (SPU) 420 for generating music, sound effect, etc. based on an instruction from the CPU 410, and a sound buffer 422 for storing therein the music, sound effect, etc. generated by the SPU 420. The signals of the music, sound effect, etc. generated by the SPU 420 are supplied to a sound terminal of the speaker 414 or the monitor 18, and outputs (generates sound) the supplied signals to the speaker 414 or the monitor 18 as the music, sound effect, etc.

The SPU 420 has an ADPCM (adaptive differential PCM) decoding function for reading audio data which is subjected to adaptive differential PCM coding for converting audio data corresponding to 16 bits to a differential signal corresponding to four bits, a replaying function for generating the sound effect, etc. by reading waveform data stored in the sound buffer 422, a modulating function for modulating the waveform data stored in the sound buffer 422 and reading the modulated data, and the like.

The sound generating system 412 with the above functions can be used as a sampling sound source for generating music, the sound effect, etc. in response to the instruction from the CPU 401 based on the waveform data which is recorded to the sound buffer 422.

Figure 2:
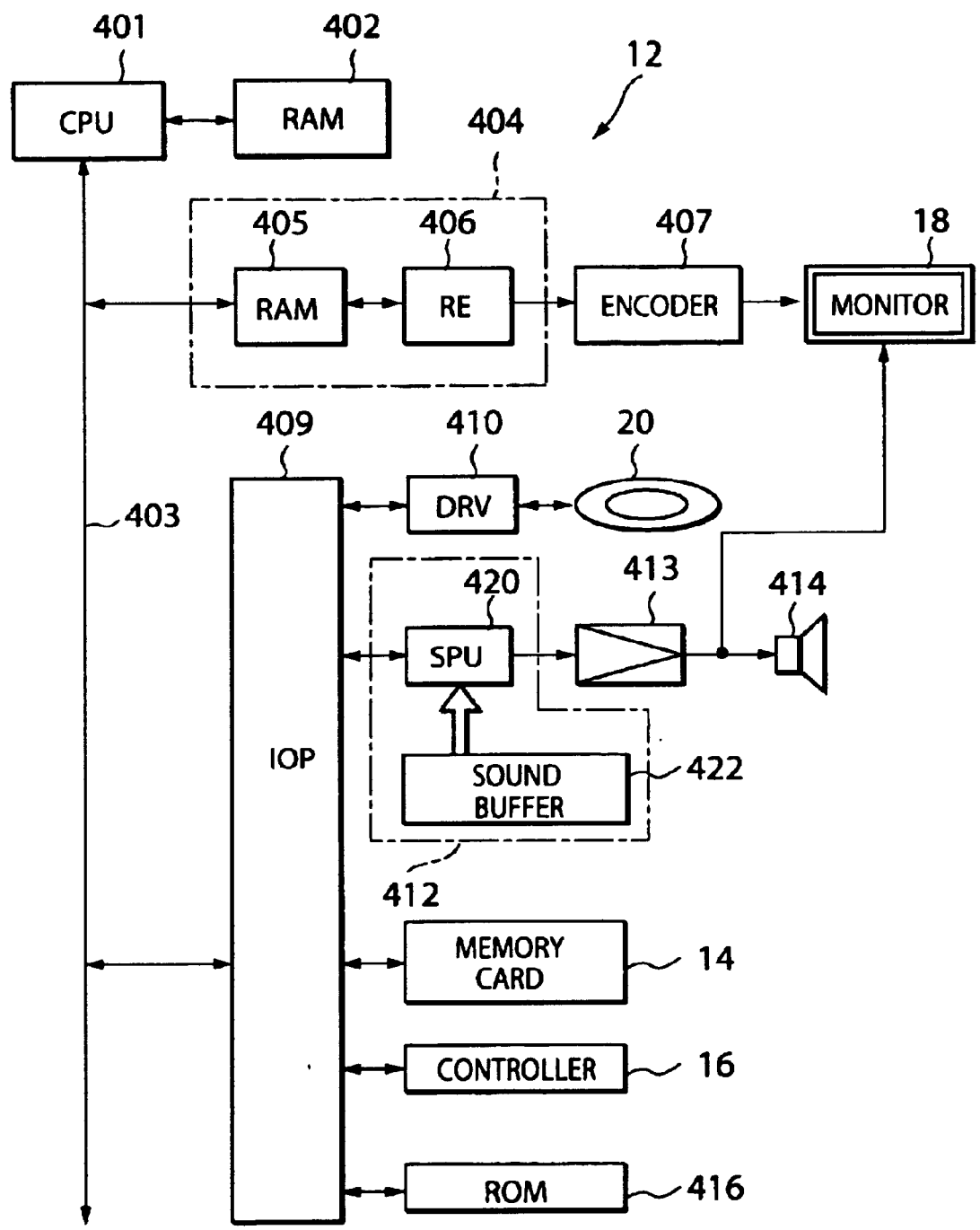
FIG. 2 is a block diagram showing the structure of circuits in the entertainment system according to the embodiment.

The memory card 14 is a card-type external storage unit comprising a CPU or a gate array, and a flash memory, is detachable to the entertainment device 12 shown in FIG. 2 via the inlet 30, and stores a middle status of the game or a program for reading DVD data, etc.

The controller 16 issues an instruction (a binary instruction or a multi-value instruction) to the entertainment device 12 by pressing a plurality of the mounted buttons. The driver 410 comprises a decoder for decoding an encoded image based on an MPEG (Moving Picture Experts Group) standard.

Hereinbelow, a description is given of characteristic functions of the entertainment system 10, for example, two functions which are executed by a random access recording medium and a program provided for the entertainment device 12 via a network according to the embodiment with reference to FIGS. 4 to 27.

A first function has processing for designating a part of a background image in accordance with a user's control instruction, processing for associating the part of the designated image with the character, and processing for allowing the character to performing a predetermined operation when the part of the designated image is correctly associated with the character.

Thus, the following video game can be realized. For instance, the user searches for a character with troubled expression, finds proper helping processing based on the behavior of the character, extracts a substance (image) regarding the helping processing from the background image, and supplies the extracted image.

If the substance regarding helping processing is a substance related to the character, the character looks like a person who is inspired, then, acts corresponding to the substance, and solves a difficulty for itself.

Figure 4:
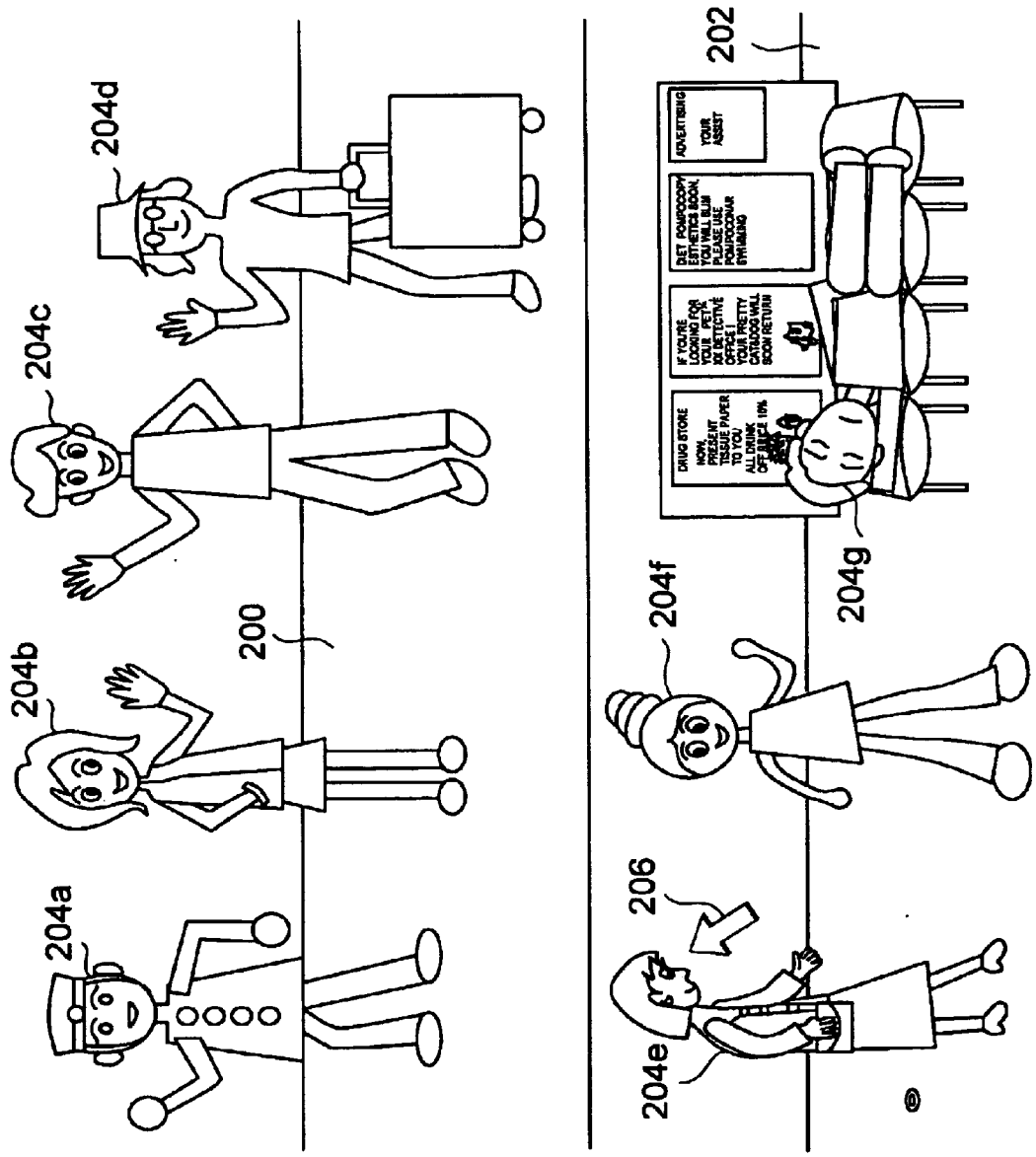
FIG. 4 is an explanatory diagram showing a scene in which, of various characters displayed on a monitor, one character looks for something with troubled expression.

A specific description is given of a series of the above operations with reference to FIGS. 4 to 26. It is assumed that as shown in FIG. 4, characters 204a to 204g are displayed at the platform of a station (e.g., two platforms 200 and 202) and the character 204e searches for something with the troubled expression.

First, a user's specific key control operation allows the cursor 206 to be displayed on the screen. The cursor 206 moves in accordance with an input operation of the left rotational control element 70 (or shift keys 51a to 51d). When an instruction for moving to the left even if the cursor 206 reaches the left end of the display screen, the screen is scrolled to the left (display image is scrolled to the right). The above-mentioned operation is similar to that in the case in which the cursor 206 reaches the right end, the top, or the bottom of the display screen.

If a user's control operation of the right rotational control element 72 causes the rational control in the clockwise direction, the overall of the image displayed on the screen is enlarged and displayed by using the cursor 206 as center. An enlarging ratio corresponds to the amount of rotation (the amount of rotation in the clockwise direction) of the right rotational control element. On the contrary, if a user's control operation of the right rotation control element 72 causes the rational operation in the counterclockwise direction, the overall image displayed on the screen is reduced and displayed by using the cursor 206 as center. An reducing ratio corresponds to the amount of rotation (the amount of rotation in the counterclockwise direction) of the right rotational control element 72.

Therefore, the image displayed on the screen is reduced and displayed, thus displaying a portion of the image, which has not been displayed. Roughly, a large number of characters 204a to 204g can be viewed. By properly enlarging and displaying the image displayed on the screen, the character 204c with the troubled expression can be easily found.

The user enlarges or reduces the image displayed on the screen, thereby searching for the character 204e with the troubled expression. If there are a plurality of characters with the troubled expression, the character in the center of the screen may be preferentially determined. Or, the user may actively designate the corresponding character by using the cursor 206. In FIG. 4, the character 204e with the troubled expression is found and the cursor 206 is moved to the character 204e. In this case, if the right rotational control element 72 is rotated in the clockwise direction and is enlarged and displayed, the behavior of the character 204e is enlarged and displayed. Further, a message indicating "My earring is lost. Where?" is outputted with sound, thereby determining the helping processing.

Figure 5:
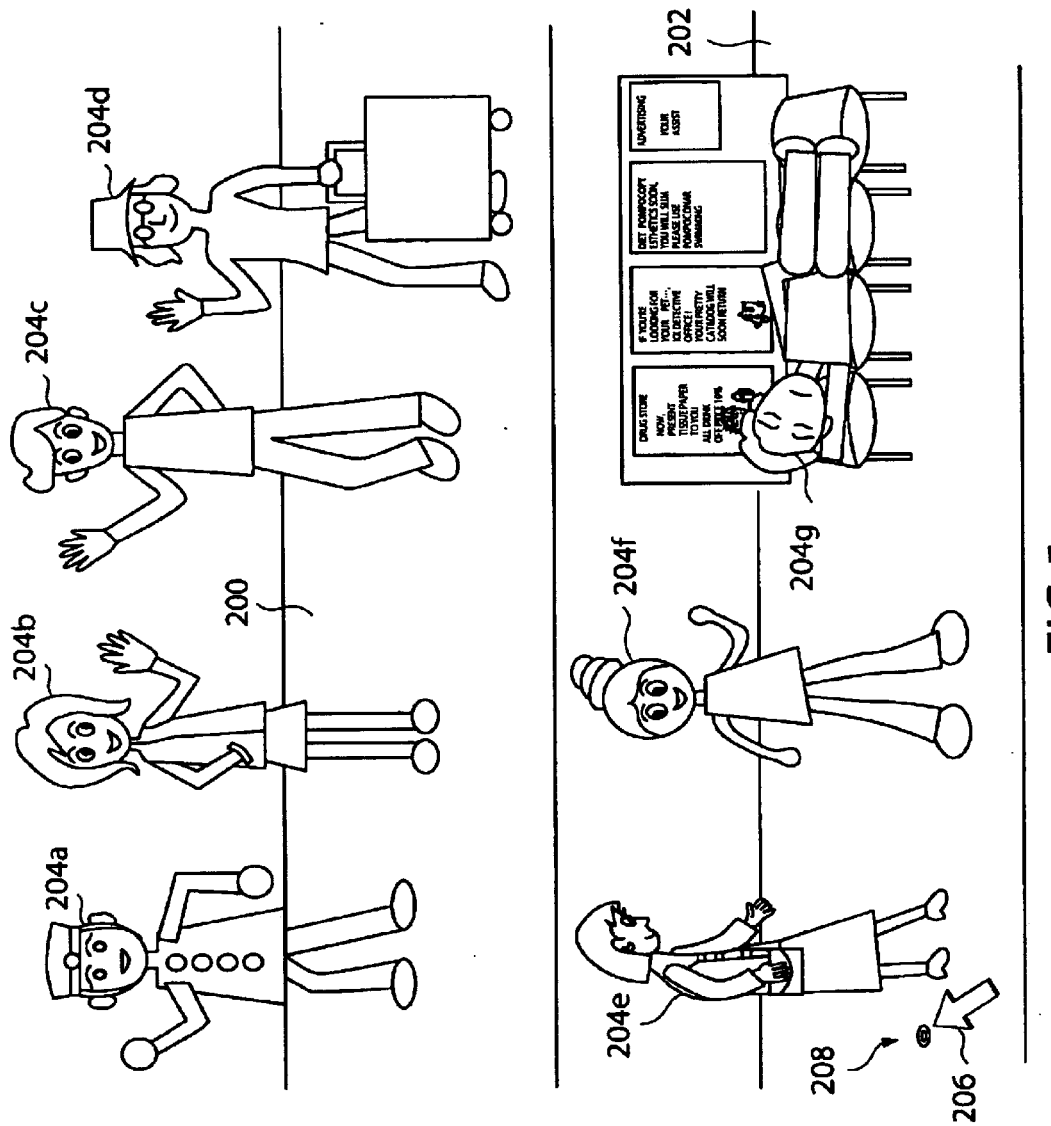
FIG. 5 is an explanatory diagram showing a status in which a cursor is moved near a black substance which is left around the character with the troubled expression.

The user searches for the peripheral portion of the character 204e and, as shown in FIG. 5, a black substance is left near the character 204e. Then, to check to see what is the black substance, the cursor 206 is moved to a black substance 208 and the black substance 208 is enlarged and displayed.

Figure 6:
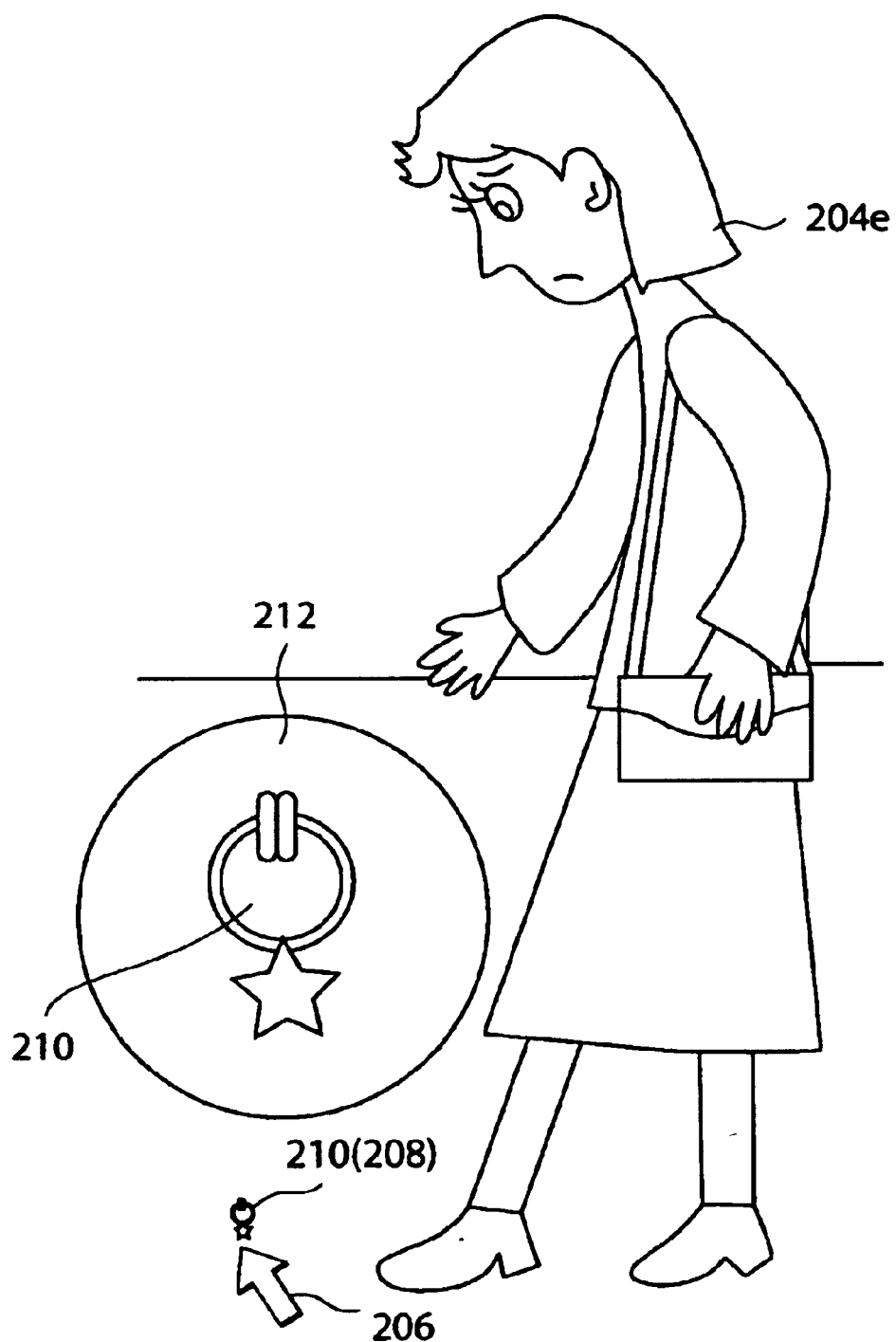
FIG. 6 is an explanatory diagram showing a status in which the overall image is enlarged and displayed by using the cursor as center and an item (in this case, an earring) to overcome the difficulty is designated.

By the enlargement and display, as shown in FIG. 6, the overall image is enlarged and displayed by using the cursor 206 as center, and it is found that the black substance 208 is an earring 210. The user inclines the left rotational control element 70, thereby moving the cursor 206 to the display position of the earring 210. Further, the user presses a determining button 52d like pressing a shutter button of a camera. In this case, an image of the earring 210 is drawn and displayed in a circular frame 212. Similarly to the cursor 206, the circular frame 212 is moved by the control operation of the left rotational control element 70.

The user moves the circular frame 212 to the display portion of the character 204e which searches for the earring 210, and controls the determining button 52d. Thereby, the character 204 expresses the inspiration of the earring 210. The character 204e goes to a place where it is expected that the earring 210 is left, and picks up the earring 210 to solve the difficulty.

That is, the user does not directly move the character 204e in the video game to solve the problem, but the inspiration is given to the character 204e and the character 204e itself solves the difficulty.

A second function has processing for enlarging and reducing the image, at least by reducing jaggy, which is displayed on the screen, in accordance with a user's control instruction.

Generally, since a resolution of interpolation is preset on displaying an image for animation, when the animation is enlarged and is displayed, there is a problem that the contour of the image for the animation becomes blur and jagged.

According to the present embodiment, the image is drawn by using a B'ezier curve. In a Bernstein base function, the number of divisions of a parameter "t" is set in accordance with the enlarging ratio or the reducing ratio and the image is drawn.

Specifically speaking, the enlarging ratio or the reducing ratio and the amount of parallel movement are taken into account and coordinates of a control point is affine transformed. A ratio of a drawing range of the B'ezier curve after the affine transformation to an actual drawing area (a drawing area of the image memory 405) is obtained. In accordance with the obtained ratio, the number of divisions is determined. If the ratio is zero or substantially small, for instance, if the B'ezier curve is not included in the actual drawing area of the image memory 405 or the displayed character or the like is substantially small (the reducing ratio is large and the drawing of the B'ezier curve is unnecessary, subsequent calculation of the B'ezier curve is canceled and the load of the calculation is removed.

On displaying the image for the animation, prior to the affine transformation, new coordinates of the control point is determined based on the operation information.

Hereinbelow, a description is given of the B'ezier curve with reference to FIGS. 7A to 11. First, mathematically, the B'ezier curve 220 is based on a polynomial function for interpolation between a first control point (start point) and a final control point (end point). The B'ezier curve 220 of n degrees is expressed by using the parameter t as follows.

$$x(t) = \sum_{i=0}^{n} x_i B_{n,i}(t) \quad (1)$$

$$y(t) = \sum_{i=0}^{n} y_i B_{n,i}(t)$$

Coordinates of control points $P_0, P_1, P_2, \ldots$ are designated by $(x_i, y_i)$. Symbol B is called a Bernstein base function and it is expressed as follows.

$$B_{n,i}(t) = \binom{n}{i} t^i (1-t)^{n-1} \quad (2)$$

For example, when the degree is three, that is, n is three, the following B'ezier curve 220 is obtained.

$$B_{3,0}(t)=(1-t)^3$$
$$B_{3,1}(t)=3t(1-t)^2$$
$$B_{3,2}(t)=3t^2(1-t)$$
$$B_{3,3}(t)=t^3 \quad (3)$$

Figure 7A:
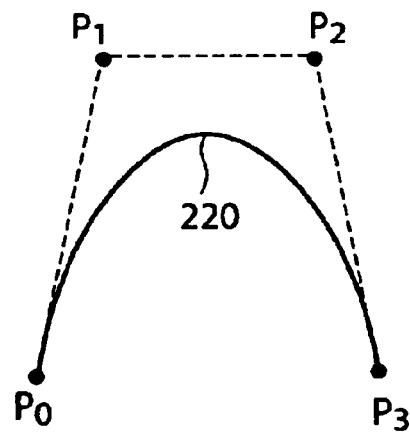
FIGS. 7A to 7C are explanatory diagrams showing display examples of a B'ezier curve.
Figure 7B:
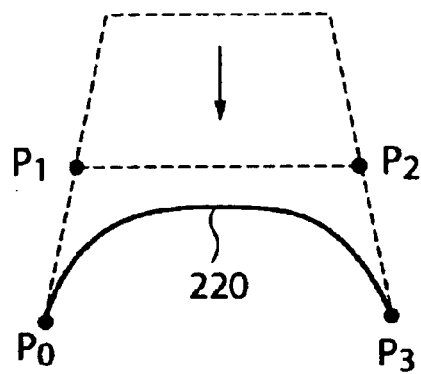
Figure 7C:
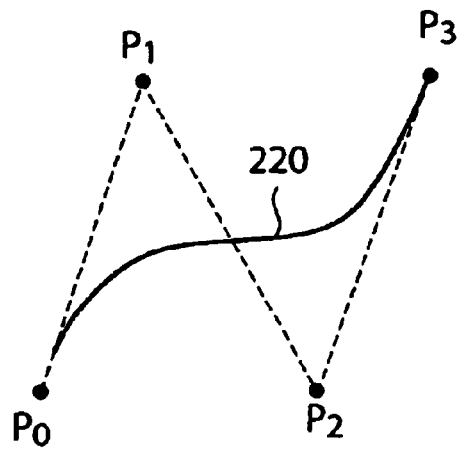

FIGS. 7A to 7C show typical drawing examples of the B'ezier curve 220 of three degrees. FIG. 7B shows the drawing example in which the B'ezier curve 220 is drawn by moving down the control points $P_1$ and $P_2$ in FIG. 7A in parallel. It is assumed that the parameter t changes from 0 to 1, it matches the control point (start point) $P_0$ when t=0, and it matches the control point (end point) $P_3$ when t=1. For example, the number t of divisions is (0, ⅓, ⅔, 1), (0, 0.15, 0.35, 0.5, 0.65, 0.85, 1), or the like.

Figure 8:
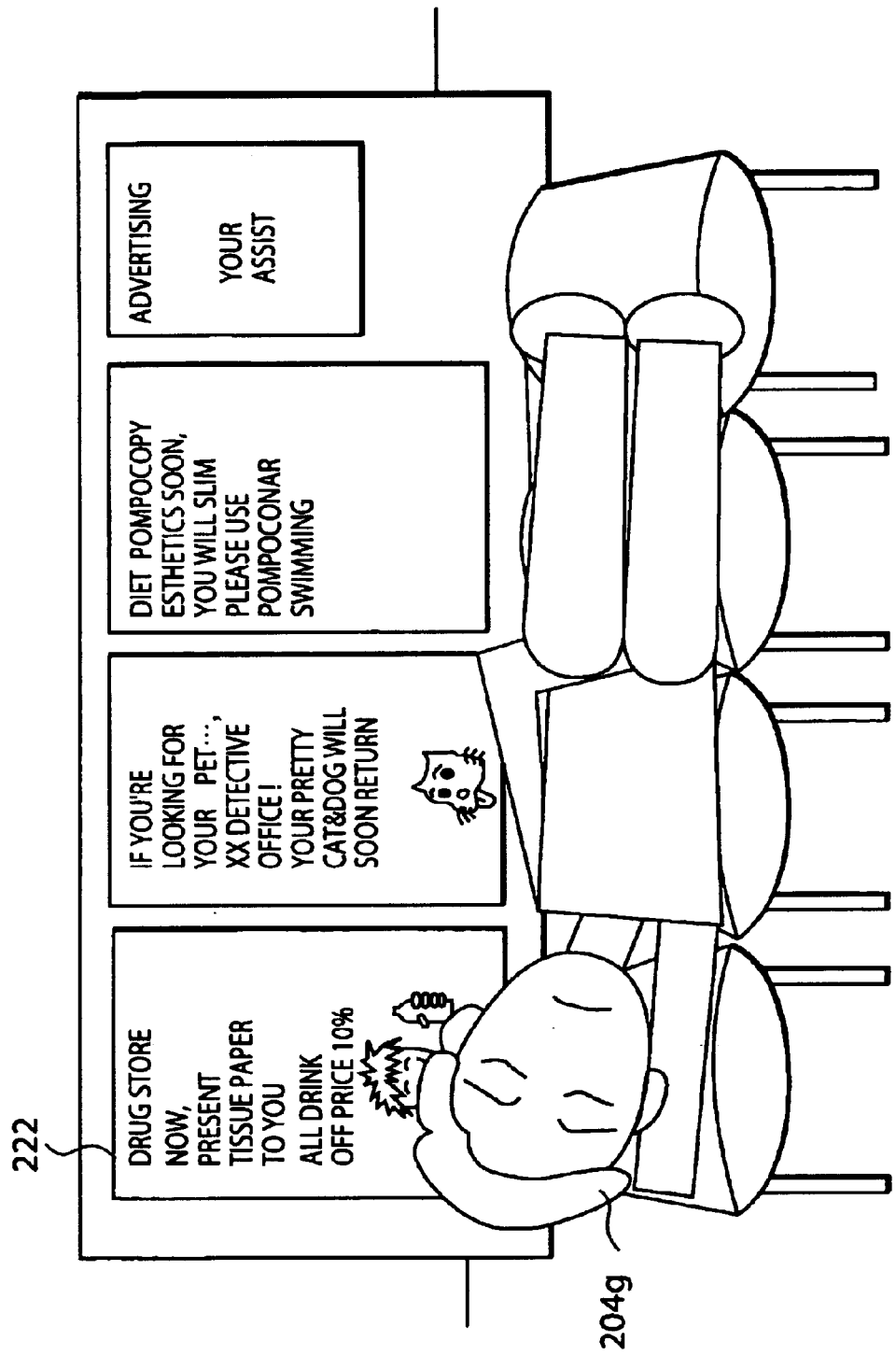
FIG. 8 is an explanatory diagram showing a part of the image shown in FIG. 5, which is enlarged.

When the character 204g or a letter 222 is drawn by using the B'ezier curve 220, as shown in FIG. 8, a plurality of components comprising the B'ezier curve 220 are drawn at designated positions, respectively, thereby completely forming the character 204g or the letter 222. One component may comprise a plurality of B'ezier curves 220.

Therefore, information on object data 230 of the characters 204a to 204g and the letter 222 is data array composed of a large number of components (a component 1, a component 2, . . . ) of one piece of object data, and each component is data array of coloration information and one or two or more pieces of B'ezier curve data BCD. One piece of the B'ezier curve data BCD includes information on the degree and the coordinates of the control point.

Referring to FIG. 9, in the case of the object data 230, the component 1 is formed by drawing three B'ezier curves 220, the component 2 is formed by drawing two B'ezier curves 220. For instance, the character indicated by the object data 230 is formed by drawing all the B'ezier curves of the component 1, the component 2, . . . , the component n.

When the image is displayed by using the B'ezier curve 220, there is the following problem in the enlargement and the reduction.

In the enlargement, the number f divisions of the parameter t needs to be increased to smooth the B'ezier curve 220. In this case, the number of calculating times is increased and the total calculating time is long.

In the enlargement, a portion over the screen is large. Since the portion is subjected to the calculation, unnecessary calculation is increased.

In the reduction, detailed calculation might be unnecessarily performed.

Then, according to the present embodiment, data at the control point is subjected to the affine transformation (transformation in the case of taking account of the enlarging ratio, the reducing ratio, and the amount of parallel movement), and it is checked whether or not new coordinates of each control point is included in the actual drawing area (drawing area of the image memory 405).

In the case of a two-dimensional image, the affine transformation is executed at each control point by using following matrix where the enlarging ratio (or reducing ratio) is s and the amount of parallel movement in horizontal direction is tx, and the amount of parallel movement in the vertical direction is ty.

$$\begin{bmatrix} s & 0 & tx \\ 0 & s & ty \\ 0 & 0 & 1 \end{bmatrix} \quad (4)$$

If all the control points are not included in the drawing area, the B'ezier curve 220 is not drawn. In this case, subsequent processing is canceled. If all the control points or a part of control points are included in the drawing area, the ratio of the drawing range of the B'ezier curve after the affine transformation to the drawing area of the image memory 405 is calculated. In accordance with the obtained ratio, the number of divisions of the parameter t is dynamically determined. More specifically, if the obtained ratio is large, the number of divisions of the parameter t becomes large, and if the obtained ratio is small, the number of divisions of the parameter t becomes small. In particular, when the obtained ratio is substantially small to need no display operation, subsequent processing is canceled.

For example, if the ratios are 1 to 5%, 6 to 20%, 21 to 40%, 41 to 60%, 61 to 80%, 81 to 95%, and 96 to 100%, the numbers of divisions of the parameter t are 2, 4, 8, 16, 32, 64, and 128, respectively. Incidentally these values are examples, the combination of the ratio and the number of divisions of the parameter can be varied and can be properly selected depending on characteristics of the display image. If the ratio is less than 1%, the drawing area does not need to be displayed and the calculation for display operation is canceled.

By the above processing, the number of calculating times can be efficiently reduced while keeping the drawn B'ezier curve 220 properly smoothed, thus realizing fast drawing of the B'ezier.

Values are calculated as the coefficient based on the Bernstein base function and the parameter t and the calculated coefficients are set in a table, thereby efficiently reducing the calculating time.

In this case, in the three-degree B'ezier curve (n=3), the number of generated coefficients for one parameter t is four, that is, $B_{3,0}(t)$, $B_{3,1}(t)$, $B_{3,2}(t)$, and $B_{3,3}(t)$, as shown in the expression (3). It is easy that the four data correspond to four data sets of single precision floating decimal point, which is loaded by many SIMD (Single Instruction Stream-Multiple Data Stream) processors, which processes a plurality of data in response to one instruction.

Specifically speaking, as shown in FIG. 10, in the normal table 232, one coefficient is stored in each record. However, in the coefficient table 234 optimized for the SIMD processor, four coefficients can be arrayed to one record. Therefore, in the coefficient table 234 in FIG. 11, the four coefficients can be read once in response to one reading instruction and, therefore, a time for referring to the coefficient 234 can be greatly reduced.

Further, to fast read necessary coefficients from the coefficient table 234, preferably, the maximum number of divisions of the parameter t (the number of coefficients prepared for the coefficient table 234) and the actual number of divisions (dynamically determined when affine converting the control point) are determined as follows.

In other words, the maximum number of divisions is $(2^n+1)$ and the number of divisions dynamically determined is $(2^m+1)$, where $m \leq n$. More specifically, FIG. 27 shows an example of the coefficient table of (16+1) divisions in the case of n=4.

In the coefficient table 234 in FIG. 27, the maximum number of divisions, e.g., (16+1) divisions, that is, all coefficients corresponding to 0/16, 1/16, 2/26, . . . , 15/16, 16/16 are obtained. From the coefficient table shown in FIG. 27, indicated at the right area, are $B_{3,0}(t)=(1-t)*(1-t)*(1-t)$, $B_{3,1}(t)=3*(1-t)*(1-t)$, $B_{3,2}(t)=3*t*t*(1-t)$, and $B_{3,3}(t)= t*t*t$.

In the case in which the number of divisions is (2+1) (m=1), four coefficients upon 0/16, four coefficients upon 8/16, and four coefficients upon 16/16 are used. In the case in which the number of divisions is (8+1) (m=3), four coefficients upon 0/16, 2/16, 4/16, 6/16, 8/16, 10/16, 10/16, 12/16, 14/16, and 16/16 are used. That is, $2^n/2^m$ can be used as the increased amount of the index referred to the coefficient table.

Since, certainly, there are the coefficients corresponding to the number $(2^m+1)$ of divisions dynamically determined in the coefficient table 234, the coefficient table 234 must not be individually formed corresponding to the number $(2^m+1)$ of divisions. A memory area for the coefficient table 234 can be reduced.

In this case, there is no coefficient table 234 with a one-to-one corresponding relationship to the number $(2^m+1)$ of divisions and, therefore, processing for referring to the coefficient table 234 might be complicated. However, since the number of $2^n/2^m$ of divisions can be used as the increase in indexes for referring to the coefficient table 234, the processing for referring to the coefficient table 234 is simplified. Although the coefficient table 234 is developed from a saved memory area, it can be referred to at a high speed.

Hereinbelow, a description is given of an example of software (scenario advancing means 300) for realizing the above functions with reference to FIGS. 12 to 26.

As mentioned above, the scenario advancing means 300 is provided for the entertainment device 12 by the random access recording medium, e.g., the optical disk 20 or the memory card 14 or via the network 202. Herein, it is assumed that the scenario advancing means 300 is read to the entertainment device 12 from the optical disk 20.

More specifically, the scenario advancing means 300 is downloaded, via predetermined processing, to the RAM 402 in the entertainment device 12 from the specific optical disk 20, which is read by the entertainment device 12 in advance. Thus, the scenario advancing means 300 runs on the CPU 401.

Figure 12:
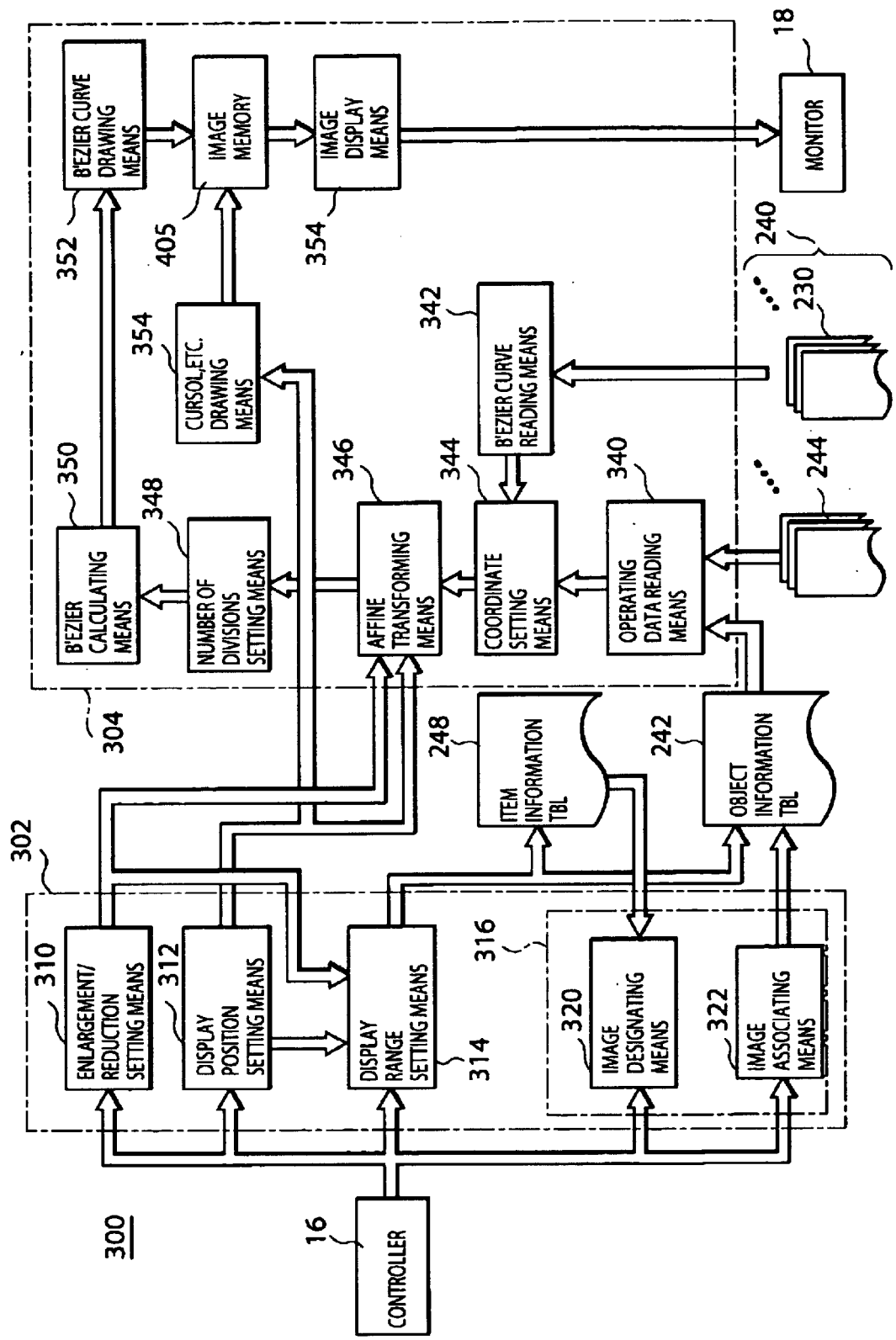
FIG. 12 is a block diagram showing functions of scenario advancing means according to the embodiment.

As shown in FIG. 12, the scenario advancing means 300 uses an object data file 240 composed of a large number of arrays of object data 230, an object information table 242 composed of information arrays of objects, including items such as the characters 204a to 204g and the earring 210, the letter 222, etc., various operation data files 244, an item information table 246 composed of information arrays of items 210 for solving the difficulty, an item information flag 248 (refer to FIG. 13), and the like.

As shown in FIG. 14, the object information table 242 registers, in records 1, 2, 3, . . . , flag information of the object data file 240, addresses at which the object data 230 is stored, item Nos. for solving the difficulty, display ranges of the objects, addresses (1) of the operation data file in which the operating sequence of the objects before solving the difficulty is described, addresses (2) of the operation data file in which the operating sequence when the object gets inspiration is described, addresses (3) of the operation data file in which the operating sequence of the object after solving the difficulty is described, and index information used in the search for the operation data file during processing.

The flag information is composed of bit information indicating whether or not the object is a character necessary for solving the difficulty (0/1 is unnecessary/necessary), bit information indicating before/after the solution of the difficulty (0/1 is before/after the solution of the difficulty), and bit information indicating whether or not the character gets inspiration (0/1 is gotten/not gotten).

Figures 15, 16:
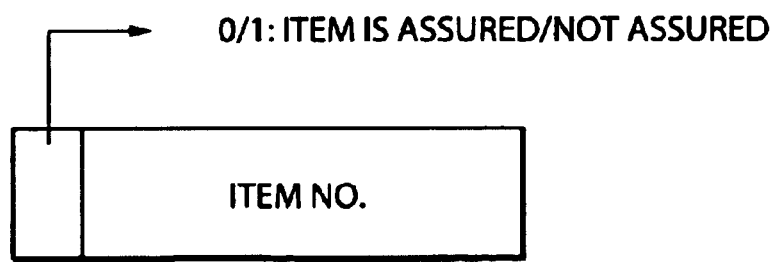
FIG. 15 is an explanatory diagram showing the content of an item information table.
FIG. 16 is an explanatory diagram showing the content of an item information flag.

As shown in FIG. 15, the item information table 246 registers, in records 1, 2, 3, . . . , register item Nos. and display ranges of the items. As shown in FIG. 16, the item information flag 248 stores therein the item No. and bit information indicating whether or not the item is assured/not assured.

As shown in FIG. 12, the scenario advancing means 300 comprises various-parameter setting means 302 for setting the enlarging ratio/reducing ratio of the image, the amount of parallel movement, and the like and image processing means 304 for image processing based on various setting items which are transmitted from the various-parameter setting means 302.

The various-parameter setting means 302 comprises enlargement/reduction setting means 310 for setting the enlargement/reduction display of the image in accordance with a user's control instruction, display position setting means 312 for setting the display position of the cursor, etc., in accordance with a user's control instruction, display range setting means 314 for affine transforming the display range of the item or the character registered in the item information table 246 or the object information table 242 and for rewriting the transformed display range to be the display range which take account of the enlarging/reducing ratio of the image or the amount of parallel movement, when the enlarging/reducing ratio or the amount of parallel movement is set, and image setting means 316 for designating a part of the image from the background image and associating the part of the image with the corresponding character.

The image setting means 316 comprises image designating means 320 for designating a part of the image from the background image in accordance with a user's control instruction and image associating means 322 for associating the designated part of the image with the corresponding character.

The image designating means 320 assures information of one item 210 for allowing the character as a target to solve the difficulty (the character 204e in FIG. 5) to execute predetermined action, from the items 210 included in the background image.

Figure 13:
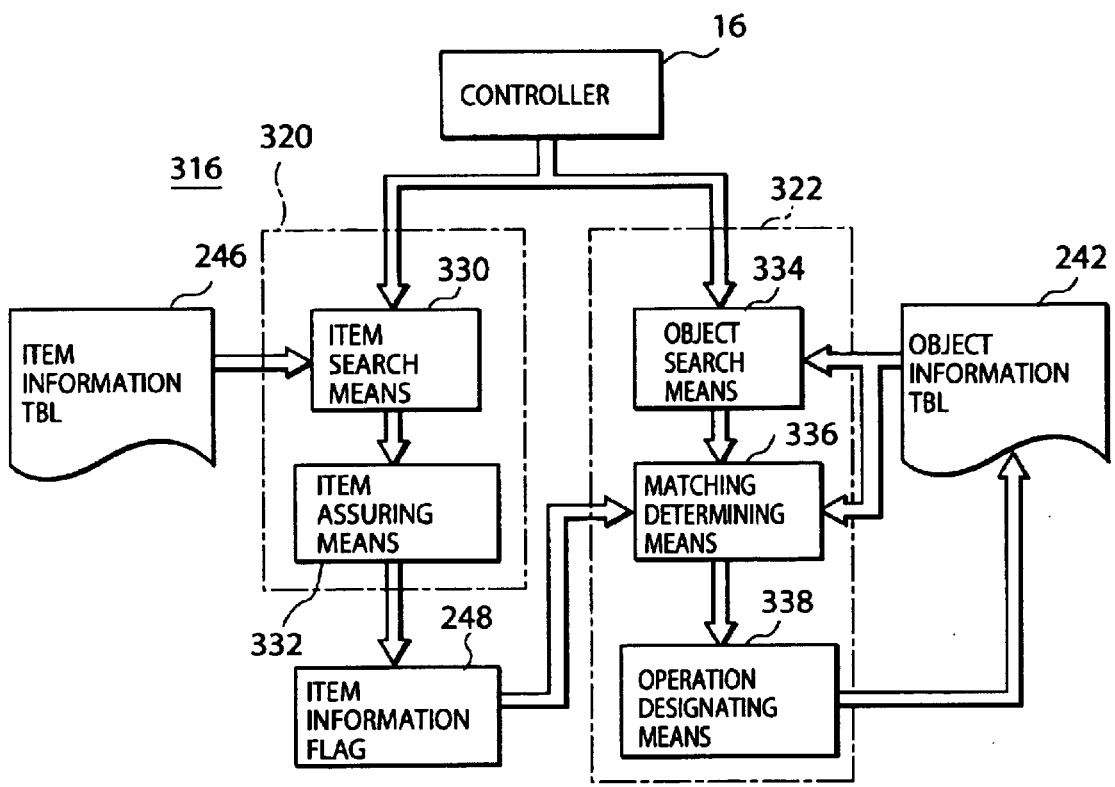
FIG. 13 is a block diagram showing functions of image setting means according to the embodiment.

Specifically speaking, as shown in FIG. 13, the image designating means 320 comprises item search means 330 for searching for information of the item 210 (item No.) from the item information table 246 based on a user's control instruction and item assuring means 332 for assuring the item No. to the item information flag 248 when the item No. is found.

The image associating means 322 comprises object search means 334 for searching for the object which is designated by a user from the object information table 242 based on a user's control instruction, matching determining means 226 for determining whether or not the item No. assured in the item information flag 248 via the image designating means 320 matches the information of the item 210 which should allow the object to execute another action (that is, the item No. registered in the object information table 242), when the object is found, and operation instructing means 338 for instructing that the object should execute other action (setting, to the flag information of the object information table 242, the bit indicating that inspiration is given) when the matching determining means 336 determines the matching.

The image processing means 304 comprises operation data reading means 340 for reading matched operation data before solving the difficulty, when the inspiration is given, or after the solving the difficulty, B'ezier curve reading means 342 for reading B'ezier curve data of the object, coordinate setting means 344 for rewriting coordinate of the control point of the B'ezier curve based on the operation data, affine transforming means 346 for affine transforming the coordinates of the control point after rewriting based on the enlarging/reducing ratio and the amount of parallel movement, number of divisions setting means 348 for obtaining a ratio of the drawing area of the B'ezier curve after affine transformation to the actual drawing area and for setting the number of divisions of the parameter t of the corresponding B'ezier curve in accordance with the obtained ratio, B'ezier curve calculating means 350 for obtaining the number of curve defining points, corresponding to the number of divisions, based on the set number of divisions, the degree, and coefficients based on the Bernstein base function, B'ezier curve drawing means 352 for drawing the corresponding B'ezier curve to the image memory 450 based on the obtained curve defining points, cursor, etc. drawing means 354 for drawing the cursor 206 and a circular frame 212 to the image memory 405, and image display means 354 for outputting the image drawn to the image memory 405 to the monitor 18 and for displaying the image on the screen of the monitor 18.

Hereinbelow, a description is given of processing operations of the scenario advancing means 300 with reference to FIGS. 17 to 26.

Figure 17:
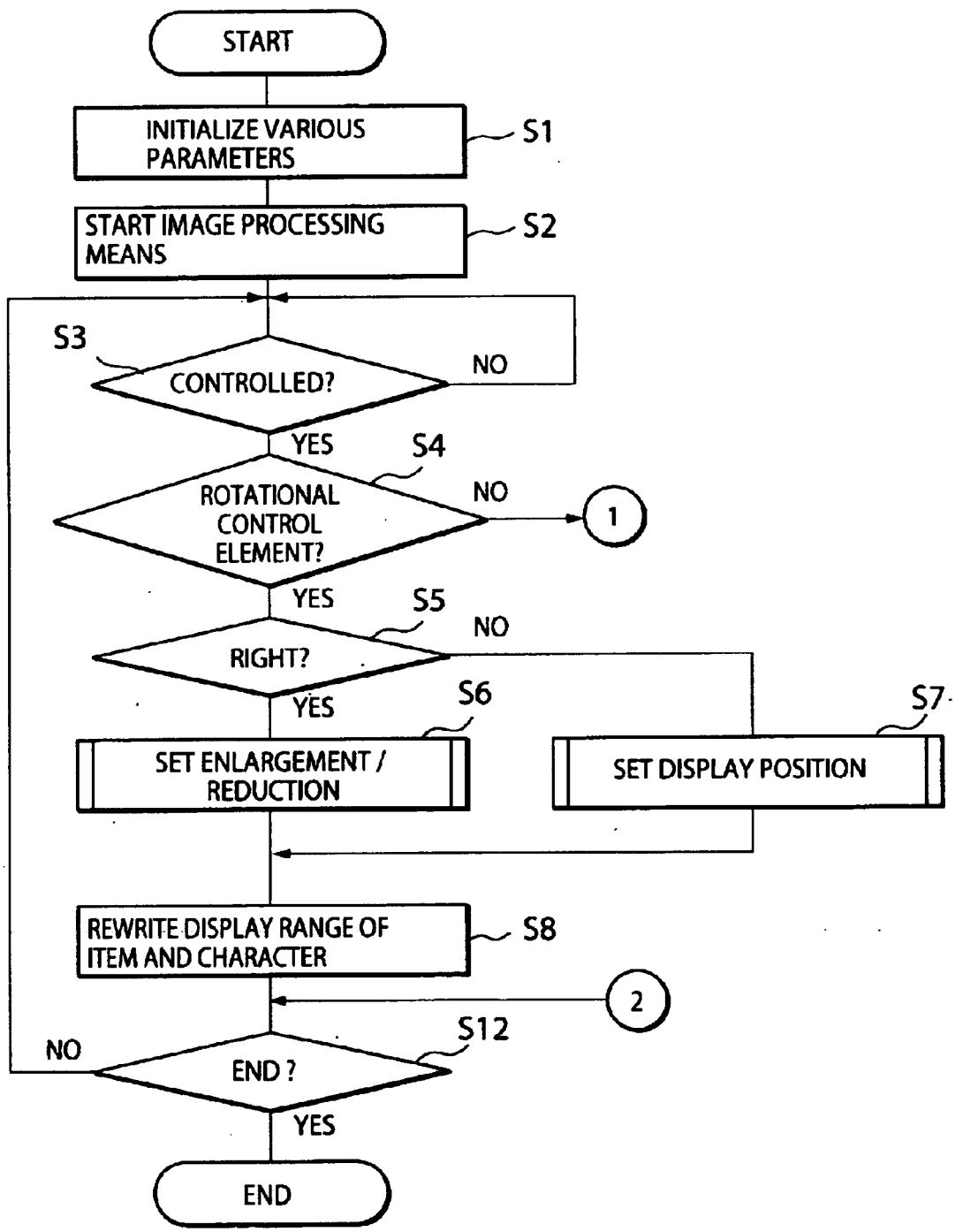
FIG. 17 is a flowchart (1) showing processing operations of the scenario advancing means.

Referring to FIG. 17, the various-parameter setting means 302 in the scenario advancing means 300 first initializes various parameters such as the enlarging/reducing ratio and the amount of parallel movement in step S1. In step S2, the various-parameter setting means 302 starts the image processing means 304. The various-parameter setting means 302 and the image processing means 304 operate on a multi-task system. Processing operations of the image processing means 304 will be described later.

In step S3, it is determined whether or not the user's control operation is inputted. In other words, it is in a standby mode for the input of the user's control operation.

When the control operation is inputted, the processing routine progresses to step S4 whereupon this input of the control operation relates to the rotational control element 70 or 72. When this input relates to the rotational control element 70 or 72, the processing routine progresses to step S5 whereupon it is determined whether or not the right rotational control element 72 is controlled. If it is determined that the right rotational control element 72 is controlled, the processing routine progresses to step S6 to enter processing of the enlargement/reduction setting means 310.

Figure 19:
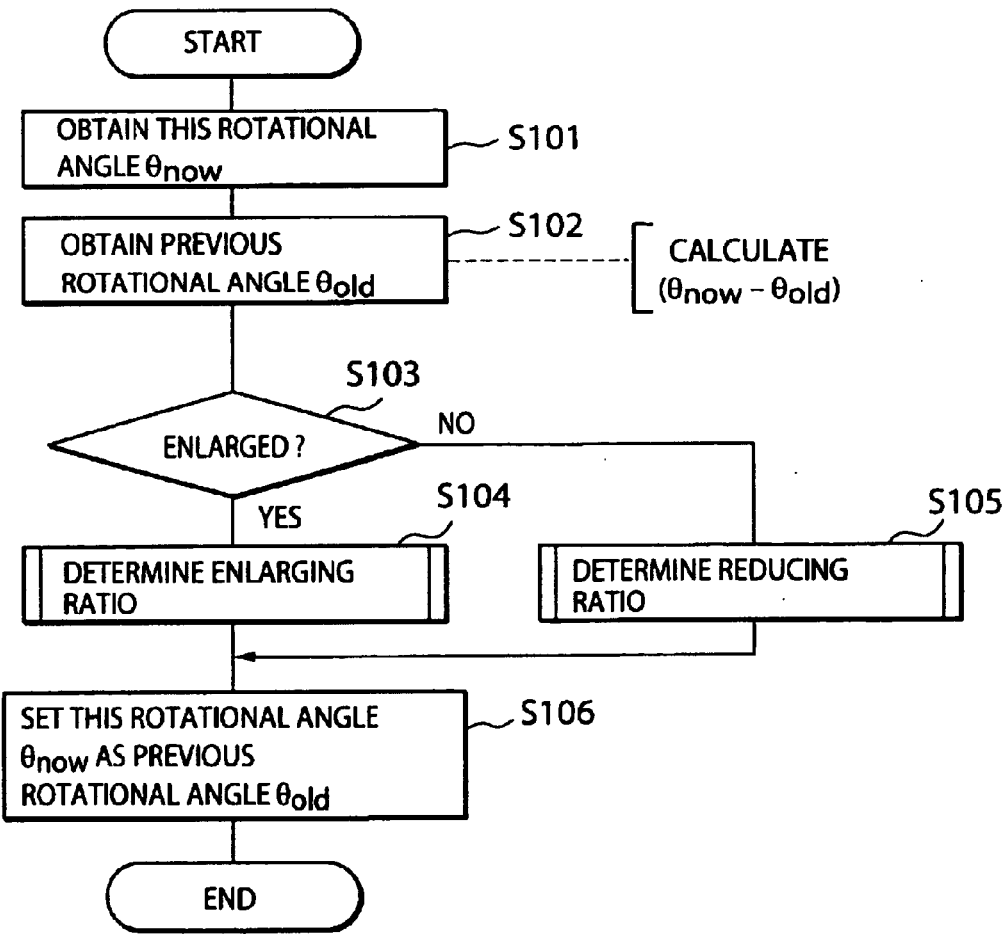
FIG. 19 is a flowchart showing processing operations of enlargement/reduction setting means.

In the processing of the enlargement/reduction setting means 310, first, in step S101 in FIG. 19, a rotational angle $\theta_{now}$ of the right rotational control element 72 is obtained. A vertical value of the right rotational control element 72 is Rv and a horizontal value thereof is Rh, and the rotational angle $\theta_{now}$ is obtained by the following expression.

$$\theta_{now}=\tan^{-1}\{(Rv-128)/(Rh-128)\}$$

In step S102, this rotational angle is compared with the previous rotational angle, thereby obtaining a value of the increased amount. Specifically speaking, a difference between this rotational angle and the previous rotational angle is obtained.

The value of the increased amount=$\theta_{now}-\theta_{old}$

Just after the program starts, an initial value is set to be the previous rotational angle. Thereafter, in step S106, this rotational angle is set as the previous rotational angle.

In step S103, it is determined whether or not this designation is enlargement. This determination is performed depending on whether or not the value of the increased amount obtained in step S102 is positive.

If the value of the increased amount is positive, this designation is enlargement and the processing routine progresses to step S104 whereupon the enlarging ratio is calculated based on the value of the increased amount and the obtained enlarging ratio is stored in a first storing area. The enlarging ratio is calculated by multiplying a predetermined coefficient to the obtained value of the increased amount. The calculation of the enlarging ratio is the same as that of the reducing ratio, which will be described later.

In step S104, it is determined that the value of the increased amount is negative, the processing routine progresses to step S105 whereupon the reducing ratio is calculated based on the value of the increased amount and the calculated reducing ratio is stored in the first storing area.

When the processing in step S104 or S105 ends, if the value of the increased amount is negative, the processing routine progresses to step S106 whereupon this rotational angle $\theta_{now}$ is set to be the previous rotational angle $\theta_{old}$. When the processing in step S106 ends, the processing of the enlargement/reduction setting means 310 ends.

A description is returned to the main routine in FIG. 17. In step S5, if it is determined that the left rotational control element 70 is controlled, in step S7, the processing routine enters processing of the display position setting means 312.

Figure 20:
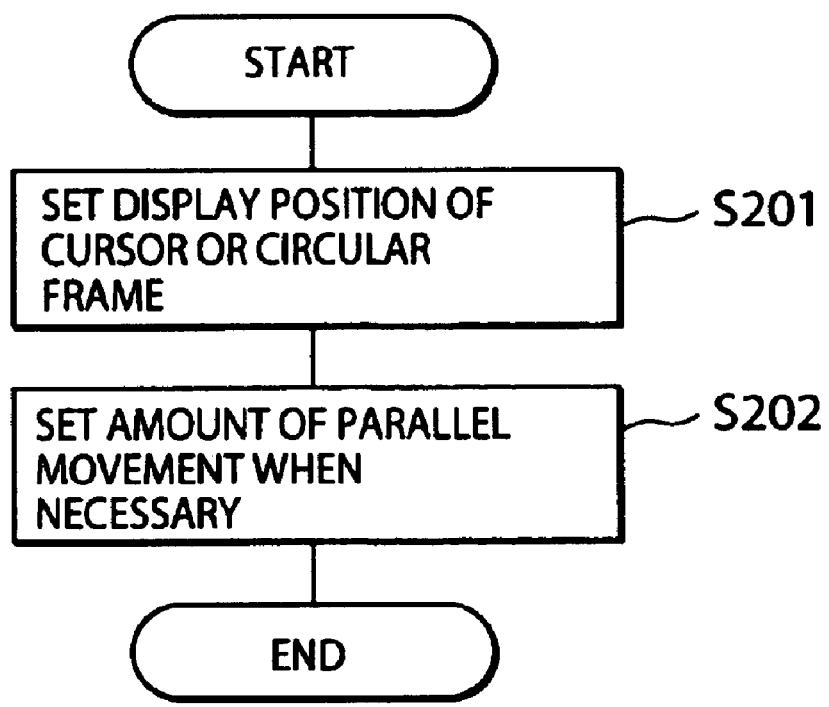
FIG. 20 is a flowchart showing processing operations of display position setting means.

In the processing of the display position setting means 312, first, in step S201 in FIG. 20, the amount of movement of the cursor 206 or the circular frame 212 is obtained. Coordinates at which the cursor 206 or the circular frame 212 is displayed are set and are stored in a second storing area. When a vertical value and a horizontal value of the left rotational control element 70 are Lv and Lh, respectively, the amount of movement is obtained by the following expression.

The amount of movement in the x-direction=$(Lh-128) \times$ coefficient

The amount of movement in the y-direction=$(Lv-128) \times$ coefficient

Values of the amount of movement are position and negative ones. If the value of the amount of movement in the x-direction is positive, the cursor 206 or the circular frame 212 is moved in the right direction. If the value of the amount of movement in the x-direction is negative, the cursor 206 or the circular frame 212 is moved in the left direction. If the value of the amount of movement in the y-direction is positive, the cursor 206 or the circular frame 212 is moved up. If the value of the amount of movement in the y-direction is negative, the cursor 206 or the circular frame 212 is moved down.

In step S202, if the set coordinates are out of the drawing area of the image memory 405, the amount of parallel movement in the horizontal direction and/or the amount of parallel movement in the vertical direction is obtained, corresponding to the out-of-amounts are obtained. The obtained amounts are stored in a third storing area.

When the processing in step S202 ends, the processing of the display position setting means 312 ends.

The processing routine returns to the main routine in FIG. 17. When the processing in step S6 or step S7 ends, the processing routine progresses to step S8 whereupon when the enlarging ratio or the reducing ratio is set or the amount of parallel movement is set, the display range of the item 210 or the object, which is registered in the item information table 246 or the object information table 242, is affine transformed via the display range setting means 314, thereby rewriting the display range which takes account of the enlarging ratio or the reducing ratio and the amount of parallel movement.

Figure 18:
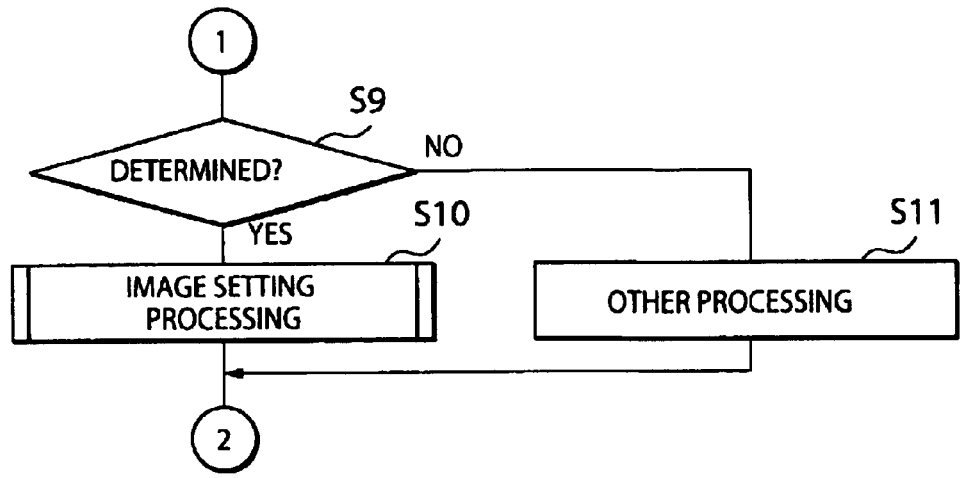
FIG. 18 is a flowchart (2) of processing operations of the scenario advancing means.

If it is determined in step S4 that the input of the control operation does not relate to the left rotational control element 70 or the right rotational control element 72, the processing routine progresses step S9 in FIG. 18 whereupon it is determined whether or not this input of the control operation relates to the determining button 52d. If YES in step S9, the processing routine progresses to step S10 whereupon the processing of the image setting means 316 is performed. If NO in step S9, the processing routine progresses to step S11 whereupon other processing corresponding to the input of the control operation is performed.

Figure 21:
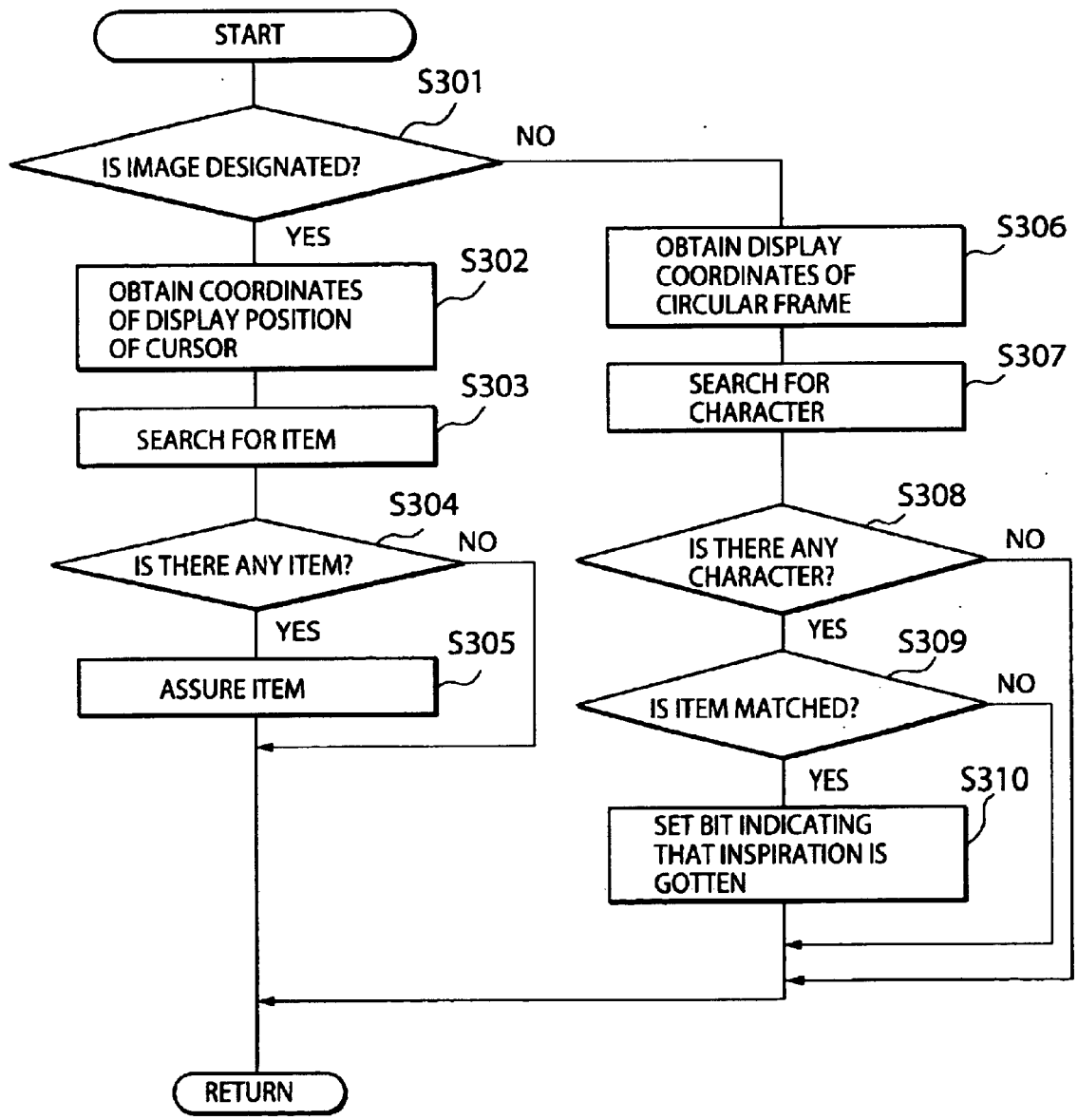
FIG. 21 is a flowchart showing processing operations of image setting means.

In the processing of the image setting means 316, in step S301 in FIG. 21, it is determined whether or not this request is designation of the image. If YES in step S301, the processing routine enters processing of the image designating means 320. In the processing of the image designating means 320, in step S302, display coordinates of the current cursor 206 is obtained from the second storing area. Thereafter, in step S303, the item 210 is searched via the item search means 330. More specifically, the record, in which the display range including the display coordinate of the cursor 206 is registered, is searched from the records in the item information table 246.

If YES in step S303, that is, if it is determined that the item 210 is found, the processing routine progresses to step S305 through step S304. In step S305, the item 210 is assured through the item assuring means 332. More specifically, the item No. registered in the record found in the search is registered in the item information flag 248, of the item information table 246. Further, "1" is set to the bit information of the item information flag 248.

On the other hand, if NO in step S301, the processing routine enters processing of the image associating means 322. In the processing of the image associating means 322, in step S306, display coordinates of the circular frame 212 displayed at the present is obtained from the second storing area.

In step S307, the object search means 334 searches for the object, as a target to solve the difficulty, (in this case, the character). More specifically, the record in which the display range including the display coordinates of the circular frame 212 is registered, is searched from the records in the object information table 242.

If YES in step S307, in other words, if the record of the character as the target is found in step S307, the processing routine progresses to step S309 through step S308. In step S309, the matching determining means 336 determines whether or not the item 210 is matched, that is, whether or not the item No. of the item 210, registered in the record found in step S307, matches the information (item No.) on the item 210, which is assured in step S305.

If YES in step S309, the processing routine progresses to step S310. In step S310, it is determined that proper inspiration is given to the character which is troubled by the difficulty, and the bit indicating before the solution of the difficulty is reset from the flag information of the record in the object information table 242. Further, the bit indicating that the inspiration is given is set.

The processing of the image setting means 316 ends when the processing in step S305 or S310 ends, when it is determined in step S304 that there is no item 210, when it is determined that the item 210 is not matched, or when the character is not found in step S308.

The processing routine returns to the main routine in FIG. 17, and progresses to step S12 in FIG. 17 when ending the processing in step S8, the processing in step S10 in FIG. 18, or the processing in step S11 in FIG. 18. In step S12 in FIG. 17, it is determined whether or not the program end is requested to the various-parameter setting means 302 (forced end, due to the shutdown of the power or a state that the game is over, is requested).

If NO in step S12 in FIG. 17, the processing subsequent to step S3 is repeated. When end of the program is requested, the processing of the various-parameter setting means 302 ends.

A description is given of processing operations of the image processing means 304 with reference to FIGS. 22 to 26.

Figure 22:
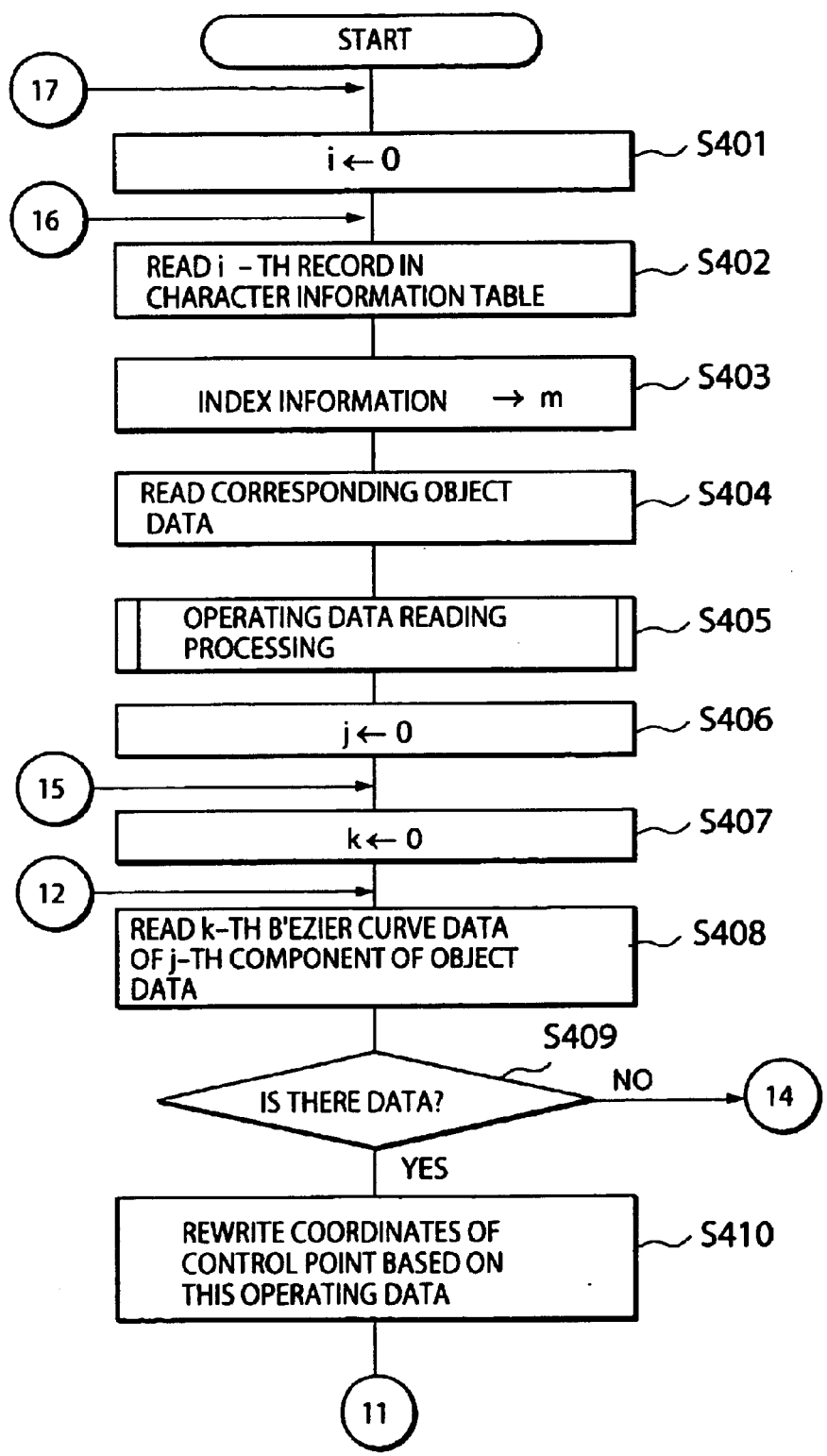
FIG. 22 is a flowchart (1) showing processing operations of image processing means.

In step S401 in FIG. 22, the image processing means 304 stores an initial value "0" to an index register, used for the search of the record in the object information table 242, and initializes the index register i.

In step S402, an i-th record in the object information table 242 is read. In step S403, the content of the index information registered in the i-th record is stored in an index register m.

In step S404, the image processing means 304 reads the object data 230, corresponding to the address thereof, which is registered in the record in the object information table 242.

In step S405, the processing routine enters processing of the operation data reading means 340. In step S501 in FIG. 25, the operation data reading means 340 determines whether the object is the character unnecessary for solving the difficulty or the character before solving the difficulty. The determination is performed based on the flag information which is registered in the record (i-th record) in the object information table.

When the object is the character having no difficulty to be solved or is the character before the difficulty is solved, m-th operation data is read from the operation data file corresponding to the address (1) of the operation data file before the difficulty is solved, which is registered in the record. If there is the operation data, the processing routine progresses to step S504 via step S503. If there is no operation data, an initial value "0" is stored in the index register m in step S505. Thereafter, the processing routine returns to step S502 whereupon the operation data is read starting from the head of the operation data file. Then, the processing routine progresses to step S504 via the step S503.

If it is determined in step S501 that the object is the character which gets inspiration or is the character after the difficulty is solved, the processing routine progresses to step S506 whereupon it is determined whether or not the object is the character which gets inspiration. If YES in step S506, the processing routine progresses to step S507 whereupon the m-th operation data is read from the operation data file corresponding to the address (2) of the operation data file which is registered in the record, when the inspiration is given.

If there is operation data, the processing routine progresses to step S504 through step S508. If there is no operation data, in step S509, the bit indicating the character after the difficulty is solved is set from the flag information in the record of the object information table 242. Then, in step S510, an initial value "0" is stored in the index register m.

When the processing in step S510 ends or it is determined in step S506 that the object is the character after the difficulty is solved, the processing routine progresses to step S511 whereupon the m-th operation data is read from the operation data file corresponding to the address (3) of the operation data file after the difficulty is solved, which is registered in the record.

If there is the operation data, the processing routine progresses to step S504 through step S512. If there is not operation data, an initial value "0" is stored in the index register m in step S513. Thereafter, the processing routine returns to step S511 whereupon the operation data is read starting from the head of the operation data file. Then, the processing routine progresses to step S504.

In step S504, a value of the index register m is incremented by 1 and, then, the processing of the operation data reading means 340 ends.

The processing routine returns to the routine in FIG. 22 again. In step S406, an initial value "0" is stored in an index register j which is used for the search of the components and the index register j is initialized. In step S407, an initial value "0" is stored in an index register k which is used for the search of the B'ezier curve data and the index register k is initialized.

In step S408, the B'ezier curve reading means 342 reads k-th B'ezier curve data BCD of a j-th component from the object data 230 which is read. If there is the k-th B'ezier curve data BCD in step S409, the processing routine progresses to step S410 whereupon the coordinate setting means 344 rewrites the coordinates of the control point based on the operation data which is read in the processing of the operation data reading means 340.

Figure 23:
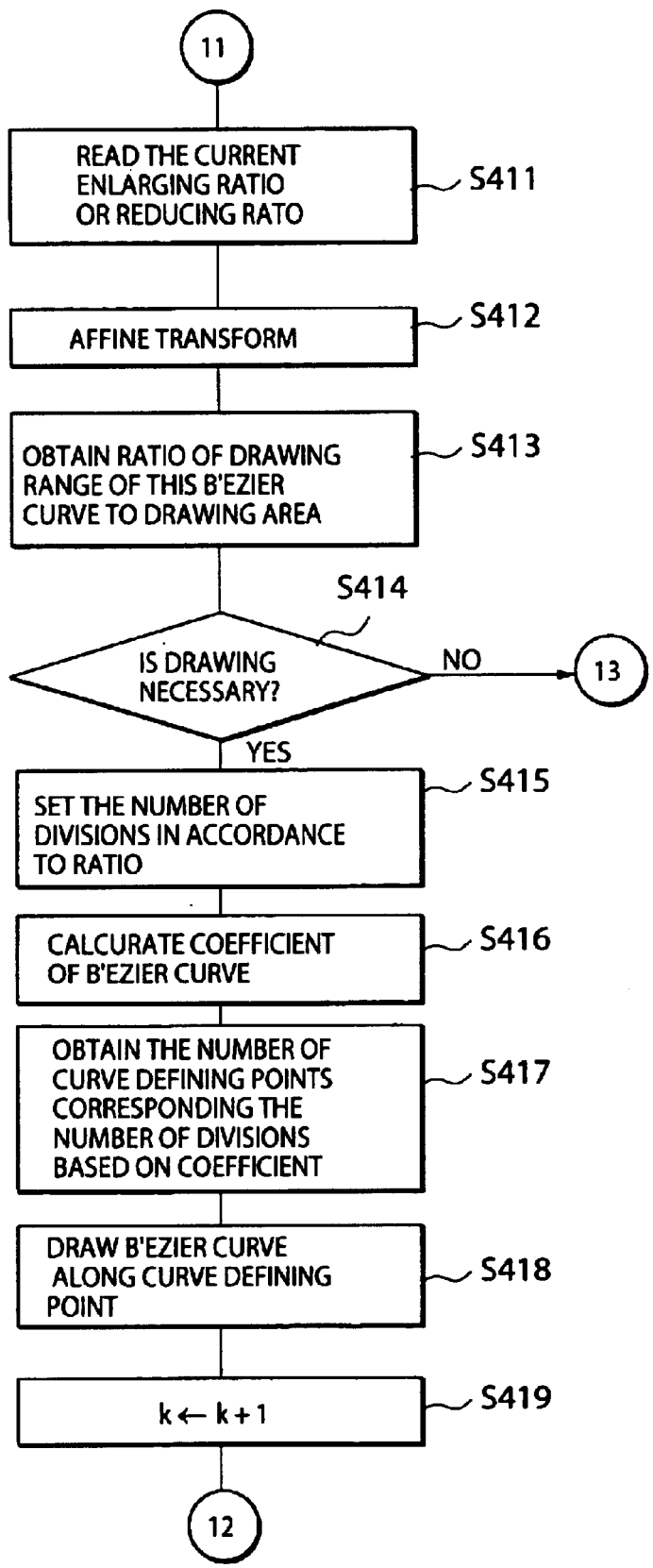
FIG. 23 is a flowchart (2) showing processing operations of the image processing means.

In step S411 in FIG. 23, the current enlarging ratio or the reducing ratio is read from the first storing area, and this amount of parallel movement is read from the third string area. In step S412, the affine transforming means 346 affine transforms the control point based on the read enlarging ratio or reducing ratio and amount of parallel movement.

In step S413, a ratio of the drawing range after the affine transformation, of the current B'ezier curve to the drawing area in the image memory 405, that is, a ratio of the drawing is obtained.

In step S414, it is determined whether or not this B'ezier curve must be drawn. The determination is based on whether or not the obtained ratio is equal to 1% or more. If it is determined that the obtained ratio is equal to 1% or more, the drawing is necessary and the processing routine progresses to step S415 whereupon the number of divisions setting means 348 sets the number of divisions of the parameter t, corresponding to the obtained ratio. Since the setting method of the number of divisions of the parameter t has been already described, the description thereof is omitted.

In step S416, the B'ezier curve calculating means 350 calculates the coefficients of this B'ezier curve based on the Bernstein base function and the number of divisions of the parameter t which is set. In step S417, the curve defining point corresponding to the number of divisions of the parameter t is determined based on the obtained coefficients.

In step S418, the B'ezier curve drawing means 352 draws the B'ezier curve along the obtained curve defining point, in particular, to the drawing area of the image memory 405 (a part or all thereof).

In step S419, the value of the index register k is incremented by 1. Then, the processing routine returns to step S408 in FIG. 22 whereupon the processing of the next B'ezier curve data BCD is performed.

Figure 24:
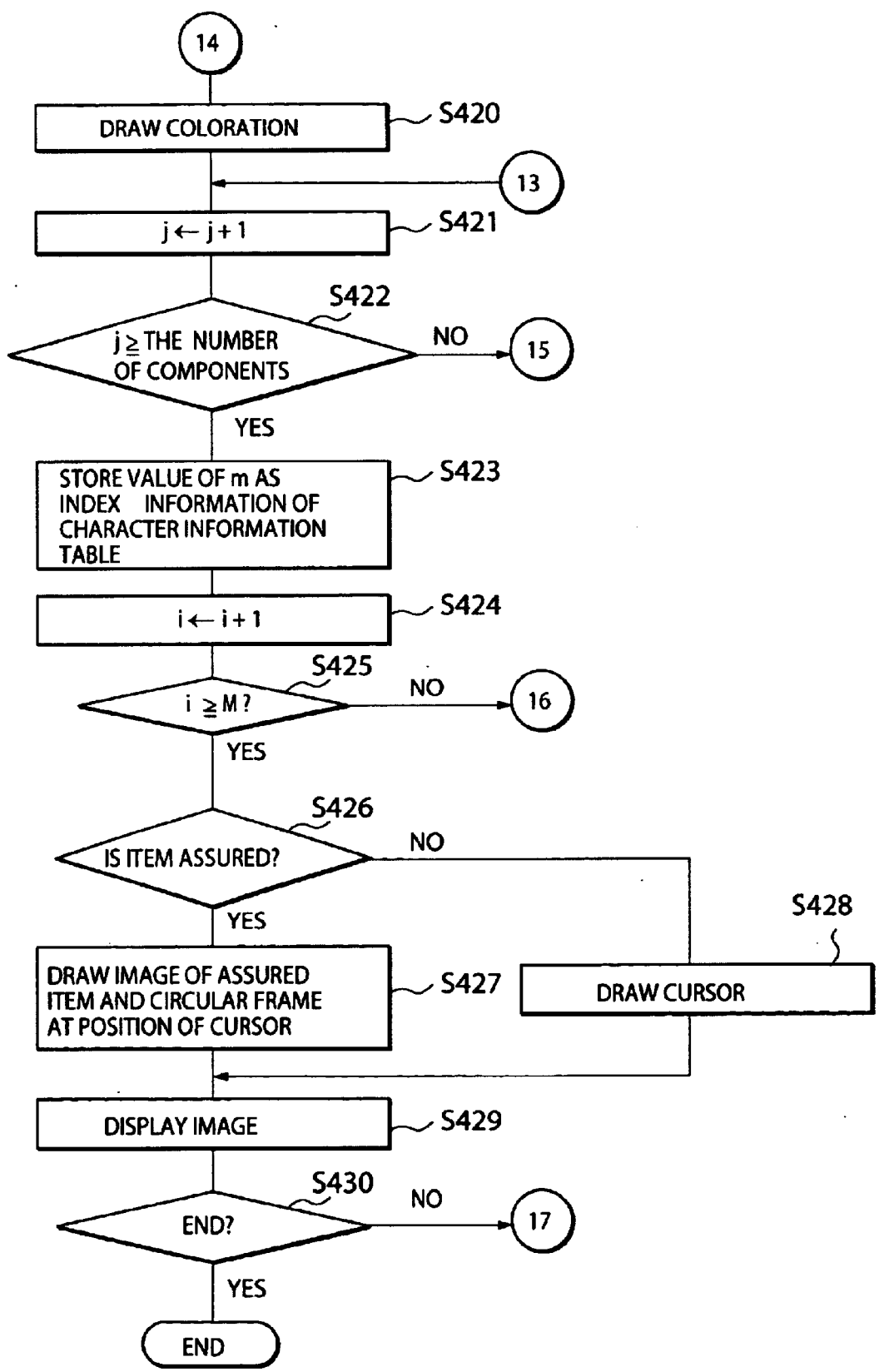
FIG. 24 is a flowchart (3) showing processing operations of the image processing means.
Figure 25:
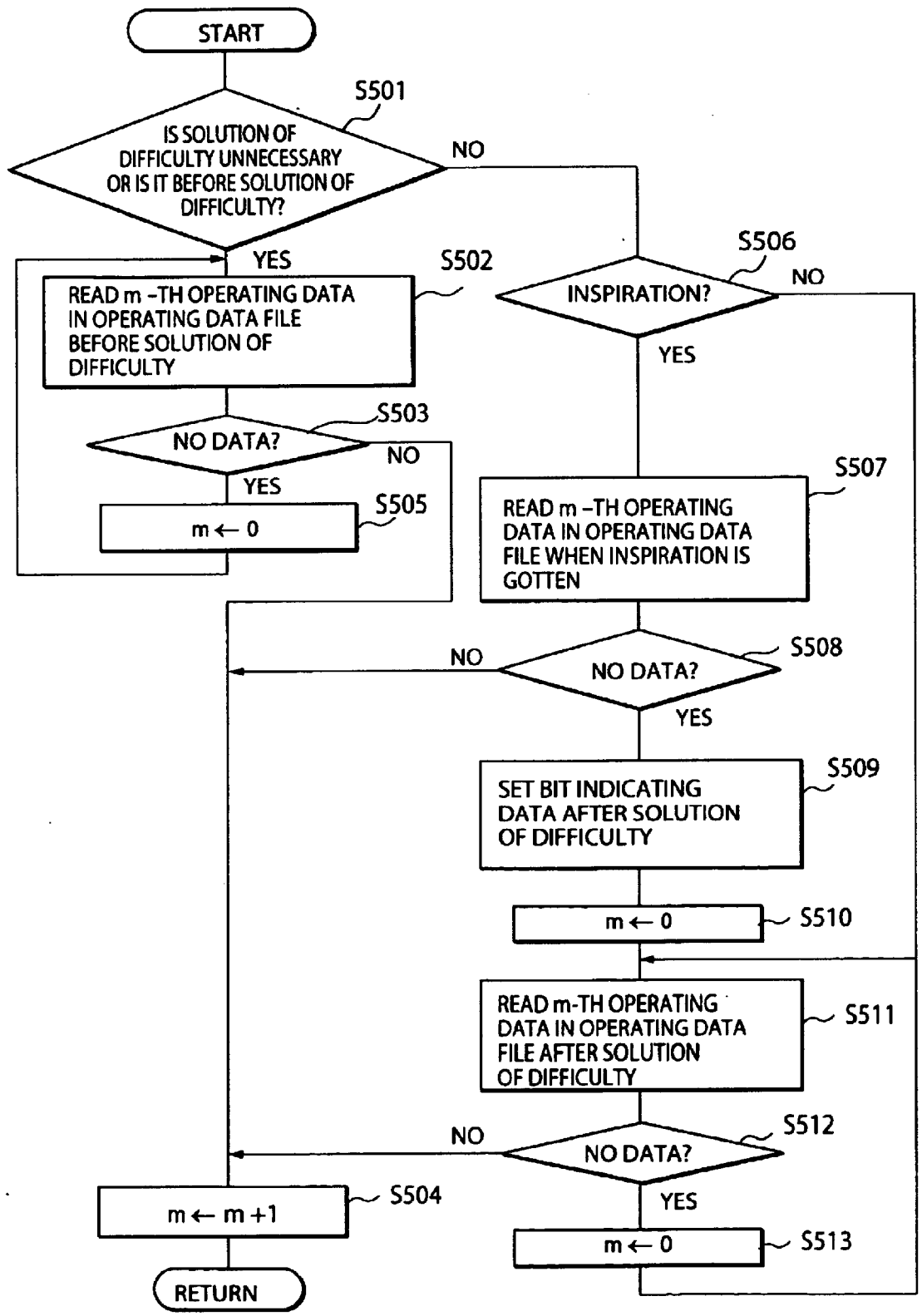
FIG. 25 is a flowchart showing processing operations of reading means of operation data.

In step S409 in FIG. 22, if it is determined that there is no B'ezier curve data BCD, that is, if the drawing of the one component ends, the processing routine progresses to step S420 in FIG. 24 whereupon the completed component is colored. The B'ezier curve drawing means 352 performs the color drawing based on coloration information which is preset every component in the object data.

If the processing in step S420 ends or if it is determined that the drawing of the B'ezier curve is unnecessary in step S414 in FIG. 23, the processing routine progresses to step S421 in FIG. 24 whereupon the value of the index register j is incremented by 1. In step S422, it is determined whether or not the processing of all the components of the object is performed. The determination is based on whether or not the value of the index register j is equal to the number of components registered in the object data 230, or more.

If the processing of all the components of the object does not end, the processing routine returns to step S407 in FIG. 22 whereupon the processing of the next component is performed. When the processing of the all components ends, the processing routine progresses to step S423 in FIG. 24 whereupon the value of the index register m is stored as the index information which is registered in the record of the object information table 242.

In step S424, the value of the index register i is incremented by 1. In step S425, it is determined whether or not the processing of all the objects ends. The determination is based on whether or not the value of the index register i is equal to the number M of objects.

If the processing of all the objects does not end, the processing routine returns to step S402 in FIG. 22 whereupon the processing of the next object is performed. When the processing of all the objects ends, the processing routine progresses to step S426 in FIG. 24 whereupon it is determined whether or not the item 210 is assured. The determination is based on whether or not the bit information in the item information flag 248 is "1".

If it is determined in step S426 that the bit information is "1" and the item 210 is assured, the processing routine progresses to step S427 whereupon the cursor, etc. drawing means 354 draws, to the position of this cursor 206 (at the coordinates stored in the second storing area), the circular frame 212 and the image of the assured item 210 (that is, the item 210 corresponding to the item No. registered in the item information flag 248).

If it is determined in step S426 that the item 210 is not assured, the processing routine progresses to step S428 whereupon the cursor, etc. drawing means 354 draws the cursor 206 to the position of this cursor 206 (at the coordinates stored in the second storing area).

When the processing in step S427 or S428 ends, the processing routine progresses to step S429 whereupon the image display means 354 outputs the image data drawn to the image memory 405 to the monitor 18 and displays the image data on the screen of the monitor 18.

In step S430, it is determined whether or not the end of the program is requested to the image processing means 304 (forced end, due to the shutdown of the power or a state that the game is over, is requested). If NO in step S430, the processing routine returns to step S410 in FIG. 22 whereupon the processing subsequent to step S410 is repeated. When end of the program is requested, the processing of the image processing means 304 ends.

In the above example, particularly, in the processing of the B'ezier curve calculating means 350 (in step S416 or S417 in FIG. 23), a method for sequentially the coefficients of the B'ezier curve is adopted. Further, in the processing of the B'ezier curve calculating means 350, if the degree of the B'ezier curve is three, the coefficients and the curve defining point may be determined by using the coefficient table 234 shown in FIG. 11, in which four coefficients are registered in one record. In this case, the coefficient can be obtained only by referring to the coefficient table 234 and the four coefficients can be read by referring to the coefficient table 234 once. Therefore, time for calculating the curve defining point can be greatly reduced.

Figure 26:
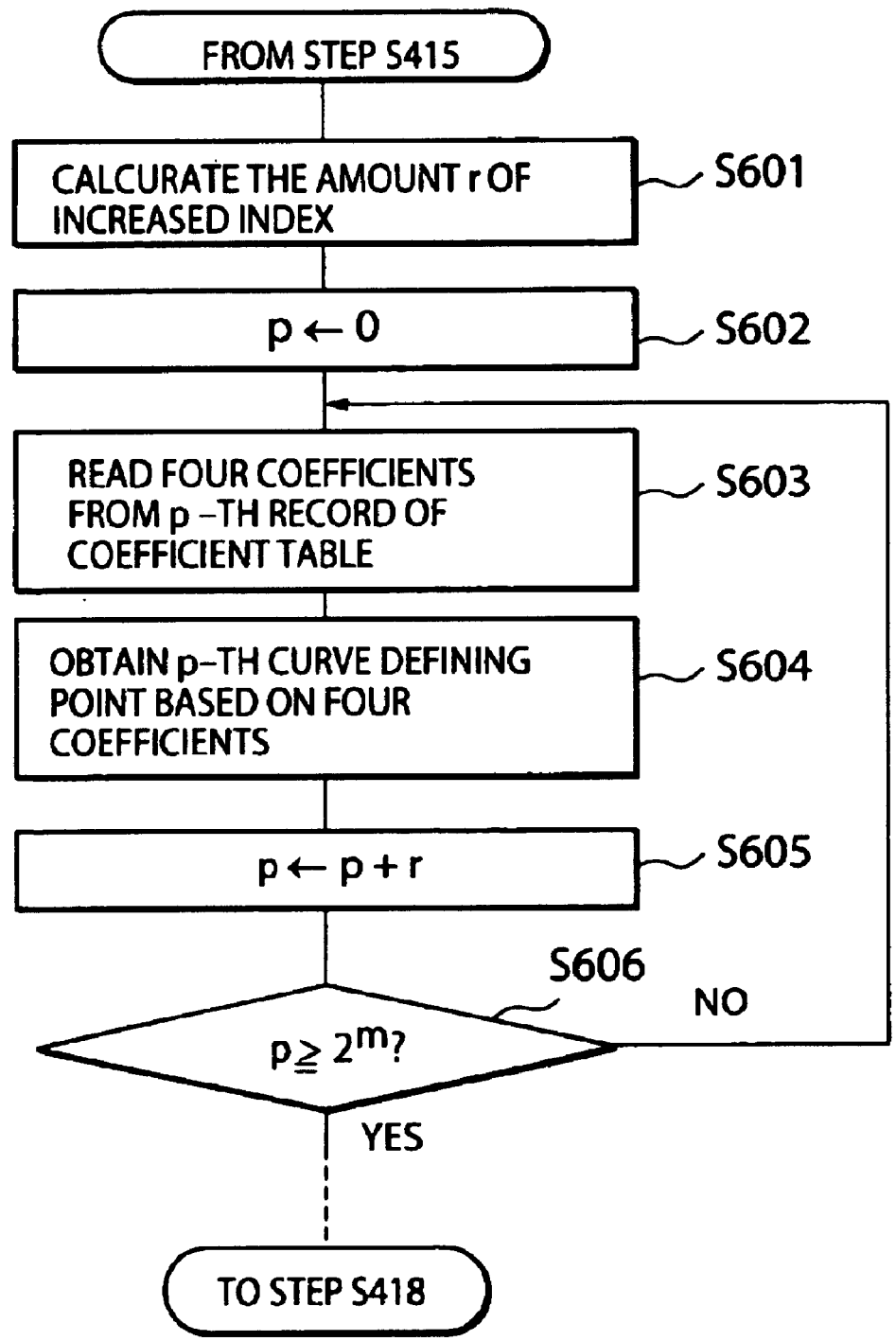
FIG. 26 is a flowchart showing a modification of processing of calculating means of B'ezier curve.

A description is given of processing for calculating the curve defined position by referring to the coefficient table 234 with reference to FIG. 26. In step S415 in FIG. 23, the number of divisions of the parameter is set. In step S601 in FIG. 26, a value r of the increased amount of indexes is calculated. In the calculation, it is assumed that the maximum number of divisions of the parameter is ($2^n$+1) and the number of divisions this time is ($2^m$+1). In this case, the value r of increased amount of the indexes can be obtained by calculating ($2^n/2^m$)

In step S602, an initial value "0" is stored in an index register p used in the search for the record of the coefficient table 234, and the index register p is initialized.

In step S603, four coefficients are read from a p-th record of the coefficient table 234. Thereafter, in step S604, a p-th curve defining point is obtained based on the read four coefficients.

In step S605, the value r of increased amount of indexes is added to a value of the index register p. In step S606, it is determined whether or not processing for all the curve defining points included in the B'ezier curve ends. The determination is based whether or not the value of the index register p is equal to the number of divisions or more. If it is determined in step S606 that the value of the index register p is less than the number of divisions, the processing routine returns to step S603 and the processing subsequent to step S603 is repeated. When the value of the index register p is equal to $2^m$ or more, the processing routine progresses to step S418 in FIG. 23.

According to the embodiment, upon enlarging and displaying the image, the noises such as jaggy can be reduced and the image with the reduced noises can be displayed. Therefore, the image enlargement/reduction can be freely performed in accordance with the user's control instruction. The image can be enlarged and reduced in realtime. The making of the scenario of the video game is further improved.

According to the present embodiment, the image processing means 304 draws the image displayed on the screen of the monitor 18 by using the B'ezier curve and also draws the image by setting the number of divisions of the parameter in the Bernstein base function in accordance with at least the enlarging ratio or the reducing ratio.

More specifically, the coordinates of the control point is affine transformed while taking account of at least the enlarging ratio or the reducing ratio, the ratio of the drawing range of the B'ezier curve after the affine transformation to the actual drawing area is obtained, and the number of divisions of the parameter is determined according to the obtained ratio.

Thus, if the enlarging ratio is increased, the image can be drawn by increasing the number of divisions of the parameter. In the reducing ratio is increased, the image can be drawn by reducing the number of divisions of the parameter. The unnecessary calculation is omitted and the calculation time for the drawing is reduced.

According to the present embodiment, when the B'ezier curve is not included in the drawing area of the image memory 405, the subsequent calculation for the B'ezier curve is canceled. Therefore, time for calculation of the drawing can be greatly reduced. The image enlargement/reduction can be freely performed in accordance with the user's control operation. The image can be enlarged or reduced in realtime.

According to the present embodiment, when the image of the animation is displayed, prior to the affine transformation, new coordinates of the control point is determined based on the operation information for the animation. Accordingly, the enlargement/reduction of the moving image can be fast performed. The image of the video game can be enlarged/reduced in real time in accordance with the user's control instruction.

According to the present embodiment, in the modification in FIG. 26, the curve defining point of the B'ezier curve is obtained by using the coefficient table 234 (refer to FIG. 11). In this case, in the coefficient table 234, a plurality of coefficients which are obtained by the degree and the Bernstein base function, for determining one curve defining point, e.g., four coefficients are registered in the arrayed variable area (corresponding to one record) which is referred to by one-time access.

In general, the determination of one curve defining point needs the number of referring times of the table, corresponding to the number of coefficients determined by the degree and the Bernstein base function, and the processing time might be long. However, according to the present embodiment, in the modification, the table may be referred to once so as to obtain one curve defining point because the number of coefficients necessary for obtaining one curve defining point is registered in the arrayed variable area which is referred to by one-time access. Thus, the processing time can be greatly reduced.

According to the present embodiment, the enlarging ratio of the image is set based on the amount of the rotation, in one direction, of the right rotational control element 72 provided for the controller 16. The reducing ratio of the image is set based on the amount of the rotation, in another direction, of the right rotational control element 72. Therefore, the image can be enlarged or reduced only by controlling the right rotational control element 72, and the user can easily issue an instruction for enlarging or reducing the image.

The enlargement/reduction of the image is determined depending on the rotational direction of the right rotational control element 72 and, further, the enlarging ratio or the reducing ratio is determined depending the amount of rotation. Consequently, the user can apparently and easily recognize the enlargement/reduction of the image and, then, he can easily issue an instruction for enlarging or reducing the image.

According to the present embodiment, as shown in FIG. 8, since not only the characters 204a to 204g and the item 210 but also the letter 222 are drawn by using the B'ezier curve, when the image is enlarged, the blur of letters can be prevented and, in a newspaper or a board which is read by the character 204a to 204g, or in a magazine sold by a shop, the image with the letters can be freely enlarged or reduced.

Accordingly, it is unnecessary to display the letter written to the board, etc. on a different frame of a message and, therefore, the scenario of the video game can be made with realism. The different making of the scenario can be realized, for example, the difficulty is solved by obtaining various information in the video game, the user simply enjoys the background, and the like.

According to the present invention, the recording medium, the program, the image processing method, and the image processing device are not limited to the above embodiment and can be variously modified without departing the essentials of the present invention.

As mentioned above, in the recording medium, the program, the image processing method, and the image processing device of the present invention, the image can be enlarged and displayed to reduced the noises such as the jaggy and the enlargement/reduction of the image can be freely performed in accordance with the user's control instruction. The image can be enlarged/reduced in realtime and, further, the making of the scenario of the video game can be improved.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of processing at least a portion of an image to enable display of a processed portion of the image, said method comprising:

representing the portion of the image by at least one B'ezier curve that is a function of a parameter t and defined by a plurahty of control points such that the B'ezier curve intersects one of the control points when the parameter t has a minimum value and intersects another of the control points when the parameter t has a maximum value; affine transforming each of the plurality of control points based on an enlarging ratio or a reducing ratio of the portion of the image to obtain a transformed B'ezier curve defined by a plurality of transformed control points;

determining whether the transformed B'ezier curve is to be drawn within an actual drawing area of a display; and when the transformed B'ezier curve is to be drawn within the actual drawing area of the display, setting a number of divisions of the parameter t of the transformed B'ezier curve based on a ratio of a drawing area of the transformed B'ezier curve to the actual drawing area of the display, determining coefficients of the transformed B'ezier curve based on the number of divisions cf the parameter t of the transformed B'ezier curve, generating a plurality of curve defining points of the transformed B'ezier curve based on the determined coefficients, the number of curve defining points corresponding to the number of divisions of the parameter t, and drawing the transformed B'ezier curve based on the plurality of curve defining points.

2. A method as claimed in 1 wherein the control instruction includes at least one instruction selected from the group consisting of an enlarging instruction, a reducing instruction, and a parallel movement instruction.

3. A method as claimed in claim 1 wherein the transformed B'ezier curve is to be drawn when the ratio of the area of the drawing range of the transformed B'ezier curve to the actual drawing area is greater than a predefined value and when the transformed B'ezier curve iswithin the actual drawing area of the display.

4. A method as claimed in claim 1 wherein the B'ezier curve and the transformed B'ezier curve are each expressed as a weighted sum of a plurality of base functions of a specific degree.

5. A method as claimed in claim 4 wherein the coefficients of the transformed B'ezier curve are further determined based on the specific degree of the plurality of base functions.

6. A method as claimed in claim 4 further comprising storing a plurality of possible coefficients in a coefficient table, the coefficient table having a plurality of records, each of the plurality of records corresponding to a specific division of a maximum number of divisions of the parameter t and including respective ones of the plurality of possible coefficients each of which corresponds to one of the plurality of base functions so that when the coefficients of the transformed B'ezier curve are determined, the coefficients associated with a particular division of the set number of divisions are determined by a single access of the coefficient table.

7. A method as claimed in claim 1 further comprising determining, prior to affine transforming each of the plurality of control points, new coordinates of each of the plurality of control points based on the control instruction.

8. A recording medium for storing a program and data used by an image processing device to perform a method of processing at least a portion of an image to enable display of a processed portion of the image on a display, said method comprising:

representing the portion of the image by at least one B'ezier curve that is a function of a parameter t and defined by a plurality of control points such that the B'ezier curve intersects one of the control points when the parameter t has a minimum value and intersects another of the control points when the parameter t has a maximum value; affine transforming each of the plurality of control points based on an enlarging ratio or a reducing ratio of the portion of the image to obtain a transformed B'ezier curve defined by a plurality of transformed control points;

determining whether the transformed B'ezier curve is to be drawn within an actual drawing area of a display; and when the transformed B'ezier curve is to be drawn within the actual drawing area of the display, setting a number of divisions of the parameter t of the transformed B'ezier curve based on a ratio of a drawing area of the transformed B'ezier curve to the actual drawing area of the display, determining coefficients of the transformed B'ezier curve based on the number of divisions of the parameter t of the transformed B'ezier curve, generating a plurality of curve defining points of the transformed B'ezier curve based on the determined coefficients, the number of curve defining points corresponding to the number of divisions of the parameter t, and drawing the transformed B'ezier curve based on the plurality of curve defining points.

9. A recording medium as claimed in claim 8 wherein the control instruction includes at least one instruction selected from the group consisting of an enlarging instruction, a reducing instruction, and a parallel movement instruction.

10. A recording medium as claimed in claim 8 wherein the transformed B'ezier curve is to be drawn when the ratio of the area cf the drawing range of the transformed B'ezier curve to the actual drawing area is greater than a predefined value and when the transformed B'ezier curve is within the actual drawing area of the display.

11. A recording medium as claimed in claim 8 wherein the B'ezier curve and the transformed B'ezier curve are each expressed as a weighted sum of a plurality of base functions of a specific degree.

12. A recording medium as claimed in claim 11 wherein the coefficients of the transformed B'ezier curve are further determined based on the specific degree of the plurality of base functions.

13. A recording medium as claimed in claim 11 further comprising storing a plurality of possible coefficients in a coefficient table, the coefficient table having a plurality of records, each of the plurality of records corresponding to a specific division of a maximum number of divisions of the parameter t and including respective ones of the plurality of possible coefficients each of which corresponds to one of the plurality of base functions so that when the coefficients of the transformed B'ezier curve are determined, the coefficients associated with a particular division of the set number of divisions are determined by a single access of the coefficient table.

14. A recording medium as claimed in claim 8 further comprising determining, prior to affine transforming each of the plurality of control points, new coordinates of each of the plurality of control points based on the control instruction.

15. An image processing device for processing at least a portion of an image to enable display of the processed portion of the image on a display, said image processing device comprising:

curve reading means for representing the portion of the image by at least one B'ezier curve that is a function of a parameter t and defined by a plurality of control points such that the B'ezier curve intersects one of the control points when the parameter t has a minimum value and intersects another of the control points when the parameter t has a maximum value;

affine transforming means for affine transforming each of the plurality of control points based on an enlarging ratio or a rendering ratio of the portion of the image to obtain a transformed B'ezier curve defined by a plurality of transformed control points;

setting means for determining whether the transformed B'ezier curve is to be drawn within an actual drawing area of a display and for setting, when the transformed B'ezier curve is to be drawn within the actual drawing area of the display, a number of divisions of the parameter of the transformed B'ezier curve based on a ratio of a drawing area of the transformed B'ezier curve to the actual drawing area of the display;

calculating means for determining coefficients of the transformed B'ezier curve based on the number of divisions of the parameter of the transformed B'ezier curve and for generating a plurality of curve defining points of the transformed B'ezier curve based on the determined coefficients, the number of curve defining points corresponding to the number of divisions of the parameter t; and drawing means for drawing the transformed B'ezier curve based on the plurality of curve defining points.

16. An image processing device as claimed in claim 15 wherein the control instruction includes at least one instruction selected from the group consisting of an enlarging instruction, a reducing instruction, and a parallel movement instruction.

17. An image processing device as claimed in claim 15 wherein the transformed B'ezier curve is to be drawn when the setting means determines that the ratio of the area of the drawing range of the transformed B'ezier curve to the actual drawing area is greater than a predefined value and when the transformed B'ezier curve is within the actual drawing area of the display.

18. An image processing device as claimed in claim 15 wherein the B'ezier curve and the transformed B'ezier curve are each expressed as a sum of a plurality of base functions of a specific degree.

19. An image processing device as claimed in claim 18 wherein calculating means further determines the coefficients of the transformed B'ezier curve based on the specific degree of the plurality of base functions.

20. An image processing device as claimed in claim 18 further comprising a coefficient table for storing a plurality of possible coefficients, the coefficient table having a plurality of records, each of the plurality of records corresponding to a specific division of a maximum number of divisions of the parameter t and including respective ones of the plurality of possible coefficients each of which corresponds to one of the plurality of base functions so that when the coefficients of the t:ransformed B'ezier curve are determined, the calculating means determines the coefficients associated with a particular division of the set number of divisions by a single access of the coefficient table.

21. An image processing device as claimed in claim 15 further comprising coordinate setting means for determining, prior to af fine transforming each of the plurality of control points, new coordinates of each of the plurality of control points based on the control instruction.

* * * * *

UNITED STATES PATENT AND TRADEMARK OFFICE
CERTIFICATE OF CORRECTION

PATENT NO. : 6,924,823 B2
APPLICATION NO. : 09/945780
DATED : August 2, 2005
INVENTOR(S) : Yukitada Maruyama, Takafumi Fujisawa and Tomohiro Hasekura It is certified that error appears in the above-identified patent and that said Letters Patent is hereby corrected as shown below:

Column 22, line 43, "cf" should read --of--.
Column 22, lines 50-53, "A method as claimed in 1 wherein the control instruction includes at least one instruction selected from the group consisting of an enlarging instruction, a reducing instruction, and a parallel movement instruction" should read
-- A method as claimed in claim 1, wherein said affine transforming step is further based on an amount of parallel movement of the portion of the image--.
Column 54, line 54, after "claim 1" insert ",".
Column 22, lines 55-56, "drawn when the ratio of the area of the drawing range" should read --drawn within the actual drawing area of the display when the ratio of the drawing area--.
Column 22, line 58, after "and", delete "when".
Column 22, line 58, "iswithin" should read --is within--.
Column 22, line 60, after "claim 1", insert --,--.
Column 22, line 64, after "claim 4", insert --,--.
Column 23, line 1, after "claim 4", insert --,--.
Column 23, line 13, after "claim 1", insert --,--.
Column 23, line 14, "af fine" should read --said affine--.
Column 23, line 16, "control instruction" should read --enlarging ratio or the reducing ratio--.
Column 23, line 35, ";" should read --,--.
Column 23, lines 50-53, "claim 8 wherein the control instruction includes at least one instruction selected from the group consisting of an enlarging instruction, a reducing instruction, and a parallel movement instruction." should read -- claim 8, wherein said affine transforming step is further based on an amount of parallel movement of the portion of the image.--.
Column 23, line 54, after "claim 8", insert --,--.
Column 23, lines 55-56, "when the ratio of the area cf the drawing range" should read --within the actual drawing area of the display when the ratio of the drawing area--.
Column 23, line 58, after "and", delete "when".
Column 23, line 60, after "claim 8", insert --,--.
Column 23, line 64, after "claim 11", insert --,--.
Column 24, line 1, after claim 11 insert --, wherein said method--.
Column 24, line 2, "comprising" should read --comprises--.
Column 24, line 12, after "claim 8" insert --, wherein said method--.
Column 24, line 13, "comprising" should read -- comprises--.
Column 24, line 13, after "to", insert --said--.
Column 24, line 15, "control instruction" should read --enlarging ratio or the reducing ratio--.
Column 24, line 50, after "claim 15", insert --,--.

UNITED STATES PATENT AND TRADEMARK OFFICE
CERTIFICATE OF CORRECTION

PATENT NO. : 6,924,823 B2
APPLICATION NO. : 09/945780
DATED : August 2, 2005
INVENTOR(S) : Yukitada Maruyama, Takafumi Fujisawa and Tomohiro Hasekura It is certified that error appears in the above-identified patent and that said Letters Patent is hereby corrected as shown below:

Column 24, lines 51-54, "the control instruction includes at least one instruction selected from the group consisting of an enlarging instruction, a reducing instruction, and a parallel movement instruction." should read --said affine transforming means affine transforms the plurality of control points further based on an amount of parallel movement of the portion of the image.--.

Column 24, line 55, after "claim 15", insert --,--.

Column 24, lines 56-58, "when the setting means determines that the ratio of the area of the drawing range" should read --within the actual drawing area of the display when the setting means determines that the ratio of the drawing area--.

Column 24, line 59, after "and", delete "when".

Column 24, line 62, after "claim 15", insert --,--.

Column 24, line 66, after "claim 18", insert --,--.

Column 24, line 67, after "wherein", insert --said--.

Column 25, line 3, after "claim 18", insert --,--.

Column 25, line 4, "coefficient table" should read --storage unit--.

Column 25, line 5, "coefficients," should read --coefficients in a coefficient table,--.

Column 25, line 11, "t:ransformed" should read --transformed--.

Column 26, line 1, "the calculating" should read --and said calculating--.

Column 26, line 5, after "claim 15", insert --,--.

Column 26, line 7, "af fine transforming" should read -- said affine transforming means affine transforming--.

Column 26, line 9, "control instruction" should read --enlarging ratio or the reducing ratio--.

Signed and Sealed this

Seventh Day of August, 2007

JON W. DUDAS
*Director of the United States Patent and Trademark Office*